(12) United States Patent
Nakamura et al.

(10) Patent No.: US 9,673,664 B2
(45) Date of Patent: Jun. 6, 2017

(54) WIRELESS POWER RECEPTION APPARATUS, WIRELESS POWER TRANSMISSION APPARATUS, AND WIRELESS POWER TRANSMISSION AND RECEPTION SYSTEM

(75) Inventors: Toru Nakamura, Toyota (JP); Shinji Ichikawa, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 568 days.

(21) Appl. No.: 14/352,916

(22) PCT Filed: Oct. 27, 2011

(86) PCT No.: PCT/JP2011/074802
§ 371 (c)(1),
(2), (4) Date: Apr. 18, 2014

(87) PCT Pub. No.: WO2013/061440
PCT Pub. Date: May 2, 2013

(65) Prior Publication Data
US 2014/0285030 A1    Sep. 25, 2014

(51) Int. Cl.
*H02J 17/00* (2006.01)
*B60L 11/18* (2006.01)
(Continued)

(52) U.S. Cl.
CPC ............ *H02J 17/00* (2013.01); *B60L 7/14* (2013.01); *B60L 11/005* (2013.01);
(Continued)

(58) Field of Classification Search
CPC .. H02J 50/90; H02J 17/00; H02J 5/005; H02J 7/025; H02J 50/12; B60L 11/182;
(Continued)

(56) References Cited

U.S. PATENT DOCUMENTS 5,821,731 A * 10/1998 Kuki ................... B60L 11/1805
320/108
7,741,734 B2    6/2010 Joannopoulos et al.
(Continued)

FOREIGN PATENT DOCUMENTS

AU    2006269374 B2    1/2007
AU    2006269374 C1    1/2007
(Continued)

*Primary Examiner* — Ryan Johnson
(74) *Attorney, Agent, or Firm* — Oliff PLC

(57) ABSTRACT

A power transmission apparatus includes a power transmission unit and a power supply unit. A wireless power reception apparatus includes a power reception unit capable of wirelessly receiving electric power from the power transmission unit, and a control unit performing control for positional alignment between the power reception unit and the power transmission unit and for reception of electric power after the positional alignment. The magnitude of electric power received by the power reception unit from the power transmission unit is used for positional alignment between the power reception unit and the power transmission unit. The control unit sets a parameter of a power transmission and reception path so that a power receivable range that can be received by the power reception unit at any time while positional alignment is done is wider than that when electric power is received after the positional alignment.

17 Claims, 9 Drawing Sheets

(51) Int. Cl.
- *H02J 7/02* (2016.01)
- *H02J 50/90* (2016.01)
- *H02J 50/12* (2016.01)
- *H02J 5/00* (2016.01)
- *B60L 7/14* (2006.01)
- *B60L 11/00* (2006.01)
- *B60L 15/20* (2006.01)
- *H02J 7/00* (2006.01)

(52) U.S. Cl.
CPC ......... *B60L 11/182* (2013.01); *B60L 11/1803* (2013.01); *B60L 11/1824* (2013.01); *B60L 11/1829* (2013.01); *B60L 11/1833* (2013.01); *B60L 11/1846* (2013.01); *B60L 11/1861* (2013.01); *B60L 15/2009* (2013.01); *H02J 5/005* (2013.01); *H02J 7/025* (2013.01); *H02J 50/12* (2016.02); *H02J 50/90* (2016.02); *B60L 2210/10* (2013.01); *B60L 2210/30* (2013.01); *B60L 2210/40* (2013.01); *B60L 2220/14* (2013.01); *B60L 2240/423* (2013.01); *B60L 2240/547* (2013.01); *B60L 2240/549* (2013.01); *B60L 2250/16* (2013.01); *H02J 7/0004* (2013.01); *Y02T 10/645* (2013.01); *Y02T 10/7005* (2013.01); *Y02T 10/705* (2013.01); *Y02T 10/7022* (2013.01); *Y02T 10/7044* (2013.01); *Y02T 10/7072* (2013.01); *Y02T 10/7216* (2013.01); *Y02T 10/7241* (2013.01); *Y02T 10/7275* (2013.01); *Y02T 90/121* (2013.01); *Y02T 90/122* (2013.01); *Y02T 90/125* (2013.01); *Y02T 90/127* (2013.01); *Y02T 90/128* (2013.01); *Y02T 90/14* (2013.01); *Y02T 90/163* (2013.01); *Y02T 90/169* (2013.01); *Y04S 30/14* (2013.01)

(58) Field of Classification Search
CPC .............. B60L 11/1829; B60L 11/1831; B60L 11/1833; B60L 11/1838; Y02T 90/122; Y02T 90/125; Y02T 90/128
See application file for complete search history.

(56) References Cited

U.S. PATENT DOCUMENTS

| | | | | |
|---|---|---|---|---|
| 8,305,036 B2 * | 11/2012 | Toya | ........................ | H02J 7/025 320/107 |
| 8,519,569 B2 * | 8/2013 | Shimokawa | .......... | B60L 11/182 307/104 |
| 2007/0222542 A1 | 9/2007 | Joannopoulos et al. | | |
| 2008/0278264 A1 | 11/2008 | Karalis et al. | | |
| 2009/0195332 A1 | 8/2009 | Joannopoulos et al. | | |
| 2009/0195333 A1 | 8/2009 | Joannopoulos et al. | | |
| 2009/0224856 A1 | 9/2009 | Karalis et al. | | |
| 2009/0267709 A1 | 10/2009 | Joannopoulos et al. | | |
| 2009/0267710 A1 | 10/2009 | Joannopoulos et al. | | |
| 2010/0096934 A1 | 4/2010 | Joannopoulos et al. | | |
| 2010/0102639 A1 | 4/2010 | Joannopoulos et al. | | |
| 2010/0102640 A1 | 4/2010 | Joannopoulos et al. | | |
| 2010/0102641 A1 | 4/2010 | Joannopoulos et al. | | |
| 2010/0117455 A1 | 5/2010 | Joannopoulos et al. | | |
| 2010/0117456 A1 | 5/2010 | Karalis et al. | | |
| 2010/0117596 A1 | 5/2010 | Cook et al. | | |
| 2010/0123353 A1 | 5/2010 | Joannopoulos et al. | | |
| 2010/0123354 A1 | 5/2010 | Joannopoulos et al. | | |
| 2010/0123355 A1 | 5/2010 | Joannopoulos et al. | | |
| 2010/0127573 A1 | 5/2010 | Joannopoulos et al. | | |
| 2010/0127574 A1 | 5/2010 | Joannopoulos et al. | | |
| 2010/0127575 A1 | 5/2010 | Joannopoulos et al. | | |
| 2010/0133918 A1 | 6/2010 | Joannopoulos et al. | | |
| 2010/0133919 A1 | 6/2010 | Joannopoulos et al. | | |
| 2010/0133920 A1 | 6/2010 | Joannopoulos et al. | | |
| 2010/0171370 A1 | 7/2010 | Karalis et al. | | |
| 2010/0181844 A1 | 7/2010 | Karalis et al. | | |
| 2010/0187911 A1 | 7/2010 | Joannopoulos et al. | | |
| 2010/0201205 A1 | 8/2010 | Karalis et al. | | |
| 2010/0207458 A1 | 8/2010 | Joannopoulos et al. | | |
| 2010/0225175 A1 | 9/2010 | Karalis et al. | | |
| 2010/0231053 A1 | 9/2010 | Karalis et al. | | |
| 2010/0237706 A1 | 9/2010 | Karalis et al. | | |
| 2010/0237707 A1 | 9/2010 | Karalis et al. | | |
| 2010/0237708 A1 | 9/2010 | Karalis et al. | | |
| 2010/0253152 A1 | 10/2010 | Karalis et al. | | |
| 2010/0264745 A1 | 10/2010 | Karalis et al. | | |
| 2011/0221387 A1 | 9/2011 | Steigerwald et al. | | |
| 2011/0241440 A1 | 10/2011 | Sakoda et al. | | |
| 2011/0254503 A1 | 10/2011 | Widmer et al. | | |
| 2012/0043172 A1 | 2/2012 | Ichikawa | | |
| 2012/0043931 A1 * | 2/2012 | Terao | ...................... | H02J 7/025 320/108 |

FOREIGN PATENT DOCUMENTS

| | | |
|---|---|---|
| AU | 2007349874 A2 | 10/2008 |
| AU | 2010200044 A1 | 1/2010 |
| CA | 2 615 123 A1 | 1/2007 |
| CA | 2 682 284 A1 | 10/2008 |
| CN | 101258658 A | 9/2008 |
| CN | 101682216 A | 3/2010 |
| CN | 101860089 A | 10/2010 |
| CN | 102089955 A | 6/2011 |
| CN | 102195328 A | 9/2011 |
| EP | 1 902 505 A2 | 3/2008 |
| EP | 2 130 287 A1 | 12/2009 |
| IN | 735/DELNP/2008 | 5/2008 |
| IN | 6195/DELNP/2009 | 7/2010 |
| JP | A-9-213378 | 8/1997 |
| JP | A-9-215211 | 8/1997 |
| JP | A-2009-501510 | 1/2009 |
| JP | A-2010-141976 | 6/2010 |
| JP | A-2010-246348 | 10/2010 |
| KR | 2008-0031398 A | 4/2008 |
| KR | 2010-0015954 A | 2/2010 |
| WO | WO 2007/008646 A2 | 1/2007 |
| WO | WO 2008/118178 A1 | 10/2008 |
| WO | 2010/006078 A1 | 1/2010 |
| WO | WO 2010/131346 A1 | 11/2010 |

* cited by examiner

WIRELESS POWER RECEPTION APPARATUS, WIRELESS POWER TRANSMISSION APPARATUS, AND WIRELESS POWER TRANSMISSION AND RECEPTION SYSTEM

TECHNICAL FIELD

The present invention relates to a wireless power reception apparatus, a wireless power transmission apparatus, and a wireless power transmission and reception system.

BACKGROUND ART

Recently, with the purpose of preventing global warming, the electric vehicle and the plug-in hybrid vehicle configured to have a battery chargeable from a source outside the vehicle have been developed and entered the stage of practical application. Further, with the purpose of saving time and labor for charging, a technique of automatically connecting an external power source and a vehicle is being studied.

Japanese Patent Laying-Open No. 9-215211 (PTD 1) discloses a charging system for electric vehicles that enables an electric vehicle to be charged easily. This charging system includes a coil moving apparatus which movably supports an electromagnetic-induction primary coil in a recess made in the floor of a parking lot.

CITATION LIST

Patent Document

PTD 1: Japanese Patent Laying-Open No. 9-215211
PTD 2: Japanese Patent Laying-Open No. 2010-246348
PTD 3: Japanese Patent Laying-Open No. 2010-141976
PTD 4: Japanese Patent Laying-Open No. 9-213378
PTD 5: WO2010/131346

SUMMARY OF INVENTION

Technical Problem

In the aforementioned document, a magnetic sensor is used for wireless power transmission and reception by means of electromagnetic induction or the like. Use of a primary coil as a magnetic sensor is only briefly mentioned and is not specifically studied in the document.

Recently, energy transfer by means of the magnetic resonance technique has been of interest as a technique that enables electrical energy to be transferred wirelessly. The magnetic resonance technique is known as enabling transmission of electric power even over a greater distance between a power transmission unit and a power reception unit, as compared with the electromagnetic induction technique. In the aforementioned document, the way to make positional alignment therebetween for energy transfer by means of such a magnetic resonance technique is not studied.

For example, study of the way to make positional alignment is not particularly necessary for a wireless power reception apparatus like a portable device which is of low weight and easy to align positionally. For a vehicle for which positional alignment between a power transmission unit and a power reception unit is not easy, however, a positional misalignment therebetween to a certain degree has to be tolerated. Rather, it is necessary to establish a system configured to tolerate a positional misalignment to some degree and still prevent efficiency from decreasing even if there is positional misalignment.

An object of the present invention is to provide a wireless power reception apparatus, a wireless power transmission apparatus, and a wireless power transmission and reception system that provide an increased allowance for positional misalignment between the power transmission apparatus and the power reception apparatus when the power transmission apparatus and the power reception apparatus are to be positionally aligned with respect to each other.

Solution to Problem

An aspect of the present invention is directed to a wireless power reception apparatus for wirelessly receiving electric power transferred from a power transmission apparatus. The power transmission apparatus includes a power transmission unit and a power supply unit supplying AC power to the power transmission unit. The wireless power reception apparatus includes a power reception unit capable of wirelessly receiving electric power from the power transmission unit, and a control unit performing positional alignment between the power reception unit and the power transmission unit. The control unit performs a first adjustment for arranging the power transmission unit and the power reception unit at respective predetermined positions, and a second adjustment for arranging the power transmission unit and the power reception unit at respective positions that produce a higher electric power reception efficiency than the positions where the power transmission unit and the power reception unit are arranged by the first adjustment, and the control unit sets a parameter of the power transmission unit or the power reception unit so that a power receivable range that can be received by the power reception unit when the first adjustment is performed is wider than a power receivable range that can be received by the power reception unit when the second adjustment is performed.

Preferably, before an amount of misalignment due to positional misalignment between the power reception unit and the power transmission unit becomes equal to or less than a predetermined value, the control unit sets the parameter of the power transmission unit or the power reception unit so that a transfer efficiency from the power transmission unit to the power reception unit exhibits a first characteristic. After the amount of misalignment becomes equal to or less than the predetermined value, the control unit sets the parameter of the power transmission unit or the power reception unit so that the transfer efficiency from the power transmission unit to the power reception unit exhibits a second characteristic providing improved sensitivity to positional misalignment in a narrower range, relative to the first characteristic.

More preferably, the first characteristic is a characteristic that the transfer efficiency exhibits a peak when the power reception unit and the power transmission unit are arranged with a central axis of the power reception unit and a central axis of the power transmission unit positionally misaligned with respect to each other in a horizontal direction. The second characteristic is a characteristic that the transfer efficiency exhibits a peak when the power reception unit and the power transmission unit are arranged with the central axis of the power reception unit and the central axis of the power transmission unit positionally coincident with each other in the horizontal direction.

More preferably, the power transmission apparatus or the wireless power reception apparatus further includes an impedance adjustment unit for changing a characteristic of the power transmission unit or the power reception unit. The control unit instructs the impedance adjustment unit to switch the transfer efficiency from the first characteristic to the second characteristic.

Preferably, the power transmission apparatus further includes a positional alignment mechanism moving the position of the power transmission unit. The control unit instructs the positional alignment mechanism to make an adjustment by moving the position of the power transmission unit in a direction of travel of a vehicle and thereafter make an adjustment by moving the position of the power transmission unit in a right-and-left direction of the vehicle.

Preferably, the power reception unit is configured so that a difference in natural frequency between the power reception unit and the power transmission unit is within ±10%.

Preferably, a coupling coefficient between the power reception unit and the power transmission unit is 0.1 or less.

Preferably, the power transmission unit transmits electric power to the power reception unit through at least one of a magnetic field formed between the power reception unit and the power transmission unit and oscillates at a specific frequency, and an electric field formed between the power reception unit and the power transmission unit and oscillates at a specific frequency.

Another aspect of the present invention is directed to a wireless power transmission apparatus for wirelessly transmitting electric power to a power reception apparatus. The power reception apparatus includes a power reception unit, and an electrical load apparatus receiving electric power from the power reception unit. The wireless power transmission apparatus includes a power transmission unit capable of wirelessly transmitting electric power to the power reception unit, a power supply unit supplying AC power to the power transmission unit, and a control unit performing positional alignment between the power reception unit and the power transmission unit. The control unit performs a first adjustment for arranging the power transmission unit and the power reception unit at respective predetermined positions, and a second adjustment for arranging the power transmission unit and the power reception unit at respective positions that produce a higher electric power reception efficiency than the positions where the power transmission unit and the power reception unit are arranged by the first adjustment, and the control unit sets a parameter of the power transmission unit or the power reception unit so that a power receivable range that can be received by the power reception unit when the first adjustment is performed is wider than a power receivable range that can be received by the power reception unit when the second adjustment is performed.

Preferably, before an amount of misalignment due to positional misalignment between the power reception unit and the power transmission unit becomes equal to or less than a predetermined value, the control unit sets the parameter of the power transmission unit or the power reception unit so that a transfer efficiency from the power transmission unit to the power reception unit exhibits a first characteristic. After the amount of misalignment becomes equal to or less than the predetermined value, the control unit sets the parameter of the power transmission unit or the power reception unit so that the transfer efficiency from the power transmission unit to the power reception unit exhibits a second characteristic providing improved sensitivity to positional misalignment in a narrower range, relative to the first characteristic.

More preferably, the first characteristic is a characteristic that the transfer efficiency exhibits a peak when the power reception unit and the power transmission unit are arranged with a central axis of the power reception unit and a central axis of the power transmission unit positionally misaligned with respect to each other in a horizontal direction. The second characteristic is a characteristic that the transfer efficiency exhibits a peak when the power reception unit and the power transmission unit are arranged with the central axis of the power reception unit and the central axis of the power transmission unit positionally coincident with each other in the horizontal direction.

More preferably, the wireless power transmission apparatus or the power reception apparatus further includes an impedance adjustment unit for changing a characteristic of the power transmission unit or the power reception unit. The control unit instructs the impedance adjustment unit to switch the transfer efficiency from the first characteristic to the second characteristic.

Preferably, the wireless power transmission apparatus further includes a positional alignment mechanism moving the position of the power transmission unit. The control unit instructs the positional alignment mechanism to make an adjustment by moving the position of the power transmission unit in a direction of travel of a vehicle and thereafter make an adjustment by moving the position of the power transmission unit in a right-and-left direction of the vehicle.

Preferably, the power transmission unit is configured so that a difference in natural frequency between the power transmission unit and the power reception unit is within ±10%.

Preferably, a coupling coefficient between the power reception unit and the power transmission unit is 0.1 or less.

Preferably, the power reception unit receives electric power from the power transmission unit through at least one of a magnetic field formed between the power reception unit and the power transmission unit and oscillates at a specific frequency, and an electric field formed between the power reception unit and the power transmission unit and oscillates at a specific frequency.

Still another aspect of the present invention is directed to a wireless power transmission and reception system including a wireless power transmission apparatus and a wireless power reception apparatus for wirelessly receiving electric power transferred from the wireless power transmission apparatus. The wireless power transmission apparatus includes a power transmission unit and a power supply unit supplying AC power to the power transmission unit. The wireless power reception apparatus includes a power reception unit capable of wirelessly receiving electric power from the power transmission unit, and an electrical load apparatus using electric power received by the power reception unit. The wireless power transmission and reception system further includes a control unit performing positional alignment between the power reception unit and the power transmission unit. The control unit performs a first adjustment for arranging the power transmission unit and the power reception unit at respective predetermined positions, and a second adjustment for arranging the power transmission unit and the power reception unit at respective positions that produce a higher electric power reception efficiency than the positions where the power transmission unit and the power reception unit are arranged by the first adjustment, and the control unit sets a parameter of the power transmission unit or the power reception unit so that a power receivable range that can be received by the power reception unit when the first adjustment is performed is wider than a power receivable range that can be received by the power reception unit when the second adjustment is performed.

Advantageous Effects of Invention

In accordance with the present invention, positional alignment between the power transmission apparatus and the power reception apparatus with respect to each other can be performed without causing an extreme decrease of the power reception efficiency even if the power transmission unit and the power reception unit are positionally misaligned to some degree with respect to each other, and a change in the voltage received by the power reception unit can be used for the positional alignment.

DESCRIPTION OF EMBODIMENTS

Figure 1:
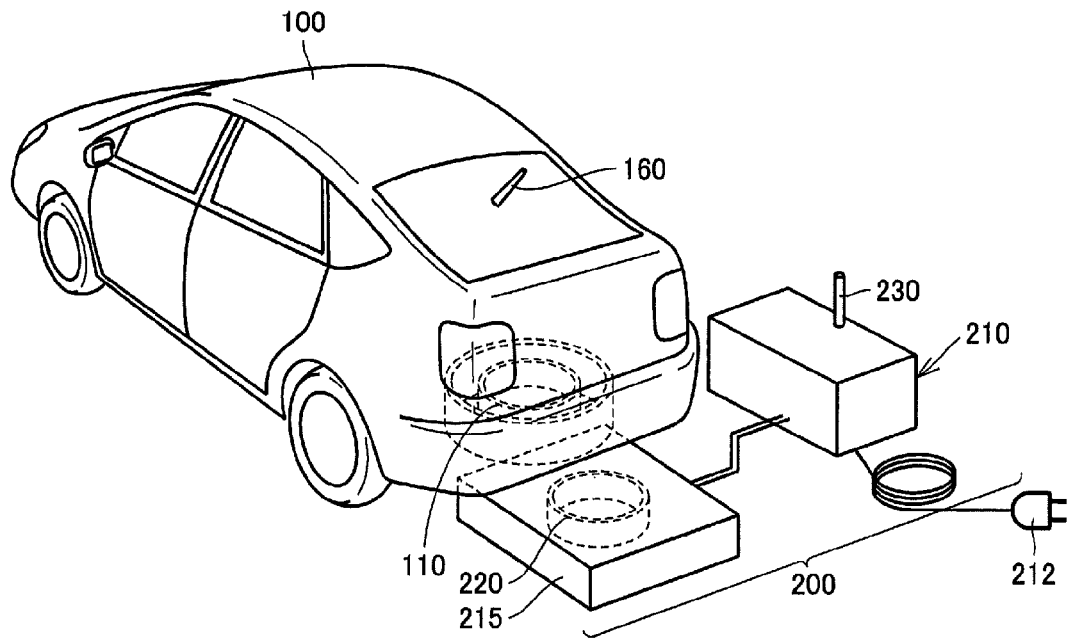
FIG. 1 is an overall configuration diagram of a power transmission and reception system in an embodiment of the present invention.

An embodiment of the present invention will hereinafter be described in detail with reference to the drawings. In the drawings, the same or corresponding elements are denoted by the same reference characters, and a description thereof will not be repeated.

FIG. 1 is an overall configuration diagram of a power transmission and reception system in an embodiment of the present invention.

Referring to FIG. 1, power transmission and reception system 10 includes a vehicle 100 and a power transmission apparatus 200. Vehicle 100 includes a power reception unit 110 and a communication unit 160.

Power reception unit 110 is mounted on the bottom surface in the vehicle's body, and configured to wirelessly receive electric power which is transmitted from a power transmission unit 220 of power transmission apparatus 200. Specifically, power reception unit 110 includes a self-resonance coil (also referred to as resonance coil) as will be described later herein, and resonates, through an electromagnetic field, with a self-resonance coil included in power transmission unit 220, and accordingly wirelessly receives electric power from power transmission unit 220. Communication unit 160 is a communication interface for vehicle 100 to communicate with power transmission apparatus 200.

Power transmission apparatus 200 includes a high-frequency power supply apparatus 210, power transmission unit 220, and a communication unit 230. High-frequency power supply apparatus 210 converts for example commercial AC power supplied through a connector 212 into high-frequency electric power and outputs it to power transmission unit 220.

Power transmission unit 220 is mounted for example on the floor of a parking lot, and configured to wirelessly transmit high-frequency electric power supplied from high-frequency power supply apparatus 210 to power reception unit 110 of vehicle 100. Specifically, power transmission unit 220 includes the self-resonance coil, and resonates, through an electromagnetic field, with the self-resonance coil included in power reception unit 110, to thereby wirelessly transmit electric power to power reception unit 110. Communication unit 230 is a communication interface for power transmission apparatus 200 to communicate with vehicle 100.

Here, in order to feed electric power from power transmission apparatus 200 to vehicle 100, it is necessary to positionally align power reception unit 110 of vehicle 100 and power transmission unit 220 of power transmission apparatus 200 with respect to each other. Vehicle 100 is not easy to positionally align. In the case of a portable device, it is easy for a user to lift the portable device in hand and place it at an appropriate position on a power feeding unit such as charger. In the case of a vehicle, however, it is necessary for a user to operate the vehicle to park it at an appropriate position, rather than to lift the vehicle in hand for positional adjustment.

In view of the above, power transmission unit 220 is housed in a housing 215 and supported in such a way that enables the power transmission unit to be moved within housing 215 in the direction of travel of the vehicle and the right-and-left direction of the vehicle by a positional alignment mechanism (not shown). This positional alignment mechanism can align the position of power transmission unit 220 with power reception unit 110 to thereby allow electric power to be transmitted to the vehicle at a high power transmission efficiency.

If electromagnetic induction is used for transmission of electric power to the vehicle, power transmission unit 220 has to be made in close contact with power reception unit 110, which requires a more complicated structure of power transmission unit 220. In view of this, it is preferable to employ the resonance technique by means of electromagnetic field so that electric power can be transmitted even if power transmission unit 220 and power reception unit 110 are considerably separated from each other. In this case, housing 215 is preferably made of a material that has a smaller influence on the resonance system, such as FRP (Fiber Reinforced Plastics), ABS (Acrylonitrile Butadiene Styrene) resin, or the like.

The resonance technique by means of electromagnetic field enables relatively large electric power to be transmitted even if the distance for transmission is several meters, and is said to have an allowance for positional misalignment that is generally larger than that of the electromagnetic induction technique. Accordingly, power transmission and reception system 10 in the present embodiment uses the resonance technique to feed electric power from power transmission apparatus 200 to vehicle 100.

In the power transmission and reception system of the present embodiment, the natural frequency of the power transmission unit and the natural frequency of the power reception unit are the same natural frequency.

"Natural frequency of the power transmission unit" means an oscillation frequency when an electrical circuit, including a coil and a capacitor, of the power transmission unit makes free oscillations. "Resonance frequency of the power transmission unit" means the natural frequency on condition that the damping force or the electrical resistance is zero in an electrical circuit, including a coil and a capacitor, of the power transmission unit.

Likewise, "natural frequency of the power reception unit" means an oscillation frequency when an electrical circuit, including a coil and a capacitor, of the power reception unit makes free oscillations. "Resonance frequency of the power reception unit" means the natural frequency on condition that the damping force or the electrical resistance is zero in an electrical circuit, including a coil and a capacitor, of the power reception unit.

"The same natural frequency" herein includes not only the case where the natural frequencies are completely identical to each other but also the case where the natural frequencies are substantially identical to each other. "Natural frequencies are substantially identical to each other" means that the difference between the natural frequency of the power transmission unit and the natural frequency of the power reception unit is within 10% of the natural frequency of the power transmission unit or the natural frequency of the power reception unit.

Figure 2:
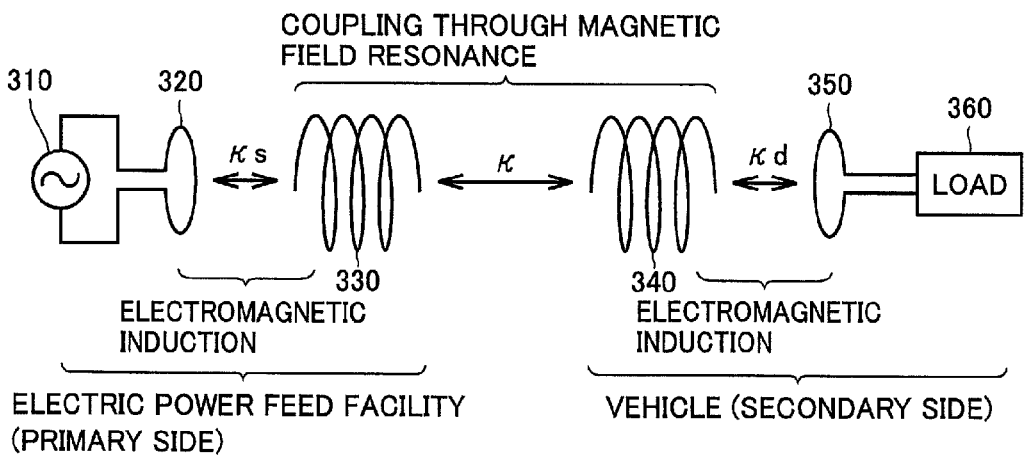
FIG. 2 is a diagram for illustrating the principle of power transmission by means of the resonance technique.

FIG. 2 is a diagram for illustrating the principle of electric power transmission by the resonance technique.

Referring to FIG. 2, regarding this resonance technique, two LC resonance coils having the same natural frequency resonate with each other in an electromagnetic field (near field), and accordingly electric power is transferred through the electromagnetic field from one coil to the other coil, similarly to two tuning forks which resonate with each other.

Specifically, a primary coil 320 is connected to a high-frequency power supply 310, and high-frequency electric power is fed by electromagnetic induction to a primary self-resonance coil 330 which is magnetically coupled with primary coil 320. Primary self-resonance coil 330 is an LC resonator implemented by an inductance of the coil itself and a stray capacitance, and resonates through an electromagnetic field (near field) with a secondary self-resonance coil 340 having the same resonance frequency as primary self-resonance coil 330. Accordingly, energy (electric power) is transferred through the electromagnetic field from primary self-resonance coil 330 to secondary self-resonance coil 340. The energy (electric power) transferred to secondary self-resonance coil 340 is picked up through electromagnetic induction by a secondary coil 350 which is magnetically coupled with secondary self-resonance coil 340, and supplied to a load 360. It should be noted that electric power transmission by the resonance technique is achieved on condition that a Q factor which represents the strength of resonance between primary self-resonance coil 330 and secondary self-resonance coil 340 is larger for example than 100.

In the electric power transmission and reception system of the present embodiment, the power transmission unit and the power reception unit are caused to resonate through the electromagnetic field, and thereby electric power is transmitted from the power transmission unit to the power reception unit, and the coupling coefficient (κ) between the power transmission unit and the power reception unit is 0.1 or less. It should be noted that in the case of electric power transfer by means of electromagnetic induction, generally the coupling coefficient (κ) between the power transmission unit and the power reception unit is close to 1.0.

As to the correspondence to FIG. 1, secondary self-resonance coil 340 and secondary coil 350 correspond to power reception unit 110 in FIG. 1, and primary coil 320 and primary self-resonance coil 330 correspond to power transmission unit 220 in FIG. 1.

In the power transmission and reception system of the present embodiment, the power transmission unit and the power reception unit are caused to resonate by means of an electromagnetic field and thereby transmit electric power from the power transmission unit to the power reception unit. Coupling of the power transmission unit and the power reception unit for this electric power transfer is referred to for example as "magnetic resonance coupling," "magnetic-field resonance coupling," "electromagnetic-field resonance coupling," or "electric-field resonance coupling."

"Electromagnetic-field resonance coupling" means coupling which includes all of "magnetic resonance coupling," "magnetic-field resonance coupling," and "electric-field resonance coupling."

As the power transmission unit and the power reception unit described herein, a coil-shaped antenna is employed. Therefore, the power transmission unit and the power reception unit are chiefly coupled together by a magnetic field, and thus the power transmission unit and the power reception unit are coupled together by "magnetic resonance coupling" or "magnetic-field resonance coupling."

It should be noted that an antenna such as meander line antenna may also be employed as the power transmission unit and the power reception unit. In this case, the power transmission unit and the power reception unit are chiefly coupled together by an electric field. At this time, the power transmission unit and the power reception unit are coupled together by "electric-field resonance coupling."

Figure 3:
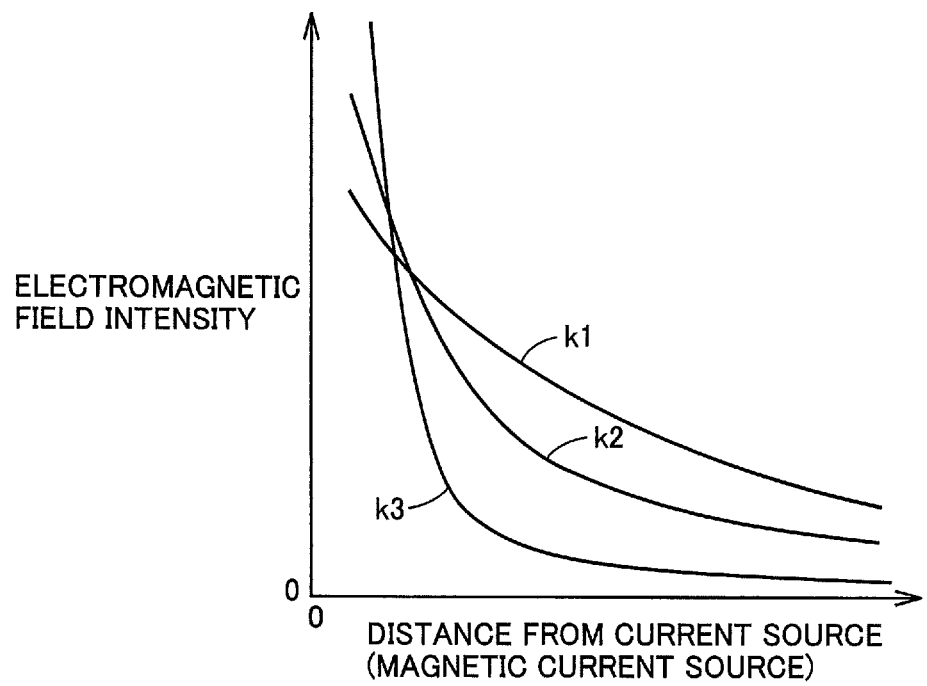
FIG. 3 is a diagram showing a relationship between the distance from a current source (magnetic current source) and the intensity of an electromagnetic field.

FIG. 3 is a diagram showing a relationship between the distance from a current source (magnetic current source) and the intensity of an electromagnetic field.

Referring to FIG. 3, the electromagnetic field includes three components. A curve k1 represents a component which is inversely proportional to the distance from a wave source and called "radiation electromagnetic field." A curve k2 represents a component which is inversely proportional to the square of the distance from the wave source and called "induction electromagnetic field." A curve k3 represents a component which is inversely proportional to the cube of the distance from the wave source and called "electrostatic field."

In the field, there is a region where the intensity of electromagnetic wave sharply decreases with the distance from the wave source. The resonance technique uses this near field (evanescent field) to transfer energy (electric power). Namely, the near field is used to cause a pair of resonators (a pair of LC resonance coils for example) having the same natural frequency to resonate with each other, and thereby transfer energy (electric power) from one resonator (primary self-resonance coil) to the other resonator (secondary self-resonance coil). Since this near field does not propagate energy (electric power) over a long distance, the resonance technique can transmit electric power with a smaller energy loss, as compared with electromagnetic wave transferring energy (electric power) by means of "radiation electromagnetic field" propagating energy over a long distance.

Figure 4:
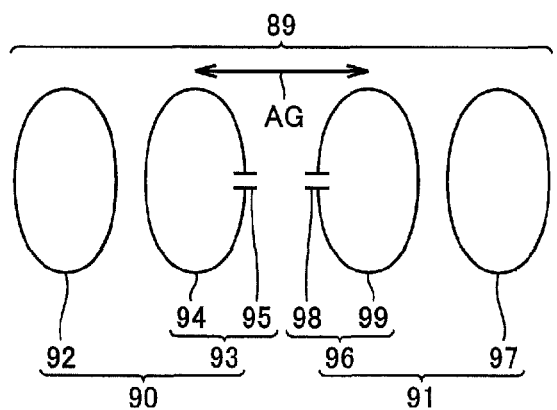
FIG. 4 is a diagram showing a simulation model of a power transfer system.
Figure 5:
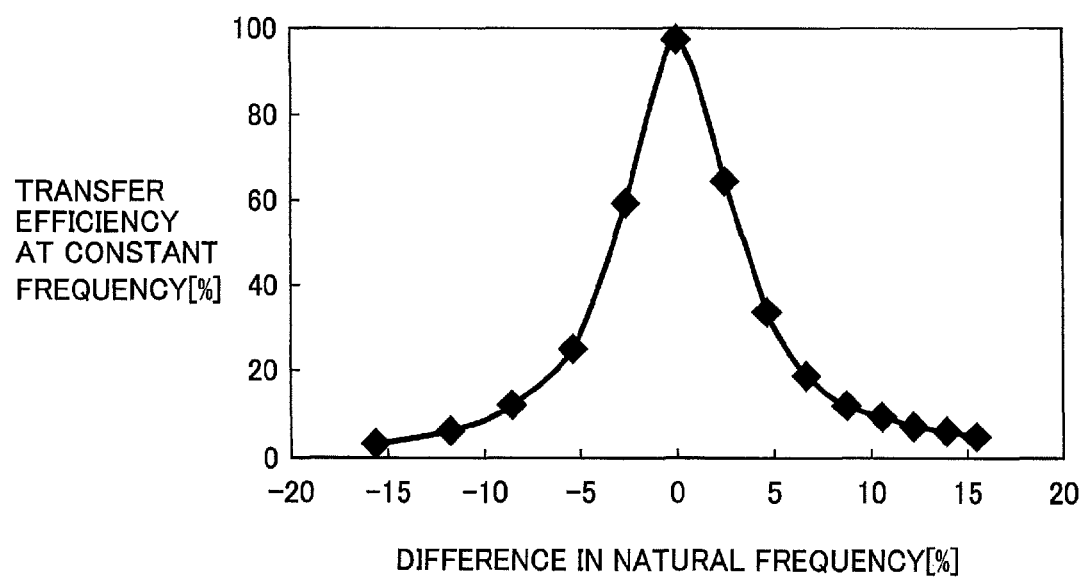
FIG. 5 is a diagram showing a relationship between a difference in natural frequency between a power transmission apparatus and a power reception apparatus, and efficiency.

A description will be given, using FIGS. 4 and 5, of a result of simulation for which an analysis was made of a relationship between a difference in natural frequency and electric power transfer efficiency. FIG. 4 is a diagram showing a simulation model of a power transfer system. FIG. 5 is a diagram showing a relationship between a difference in natural frequency between a power transmission unit and a power reception unit, and the electric power transfer efficiency.

Referring to FIG. 4, an electric power transfer system 89 includes a power transmission unit 90 and a power reception unit 91. Power transmission unit 90 includes a first coil 92 and a second coil 93. Second coil 93 includes a resonance coil 94 and a capacitor 95 connected to resonance coil 94. Power reception unit 91 includes a third coil 96 and a fourth coil 97. Third coil 96 includes a resonance coil 99 and a capacitor 98 connected to this resonance coil 99.

It is supposed herein that the inductance of resonance coil 94 is an inductance Lt and the capacitance of capacitor 95 is a capacitance C1. It is supposed herein that the inductance of resonance coil 99 is an inductance Lr and the capacitance of capacitor 98 is a capacitance C2. As each parameter is thus set, second coil 93 has a natural frequency f1 represented by Equation (1) below, and third coil 96 has a natural frequency f2 represented by Equation (2) below.

$$f1 = 1/\{2\pi(Lt \times C1)^{1/2}\} \quad (1)$$

$$f2 = 1/\{2\pi(Lr \times C2)^{1/2}\} \quad (2)$$

Here, inductance Lr and capacitances C1, C2 are fixed and only inductance Lt is varied. In this case, the relationship between a difference in natural frequency between second coil 93 and third coil 96 and the electric power transfer efficiency is shown in FIG. 5. In this simulation, resonance coil 94 and resonance coil 99 have a fixed positional relationship relative to each other, and the frequency of current supplied to second coil 93 is constant.

Regarding the graph shown in FIG. 5, the horizontal axis represents the difference (%) in natural frequency, and the vertical axis represents the electric power transfer efficiency (%) at a constant frequency. The difference (%) in natural frequency is represented by Equation (3) below.

$$\text{(Difference in Natural Frequency)} = \{(f1 - f2)/f2\} \times 100 \text{ (\%)} \quad (3)$$

As clearly seen also from FIG. 5, in the case where the difference (%) in natural frequency is 0%, the electric power transfer efficiency is close to 100%. In the case where the difference (%) in natural frequency is ±5%, the electric power transfer efficiency is approximately 40%. In the case where the difference (%) in natural frequency is ±10%, the electric power transfer efficiency is approximately 10%. In the case where the difference (%) in natural frequency is ±15%, the electric power transfer efficiency is approximately 5%. Namely, it is seen that the electric power transfer efficiency can be increased to a practical level by setting the natural frequency of second coil 93 and that of third coil 96 so that the absolute value of the difference (%) in natural frequency (deviation in natural frequency) falls in a range of 10% or less of the natural frequency of third coil 96. Further, it is more preferable to set the natural frequency of second coil 93 and that of third coil 96 so that the absolute value of the difference (%) in natural frequency is 5% or less of the natural frequency of third coil 96, since the electric power transfer efficiency can further be increased by this. It should be noted that the simulation software used herein is electromagnetic field analysis software (JMAG (registered trademark) produced by JSOL Corporation).

Figure 6:
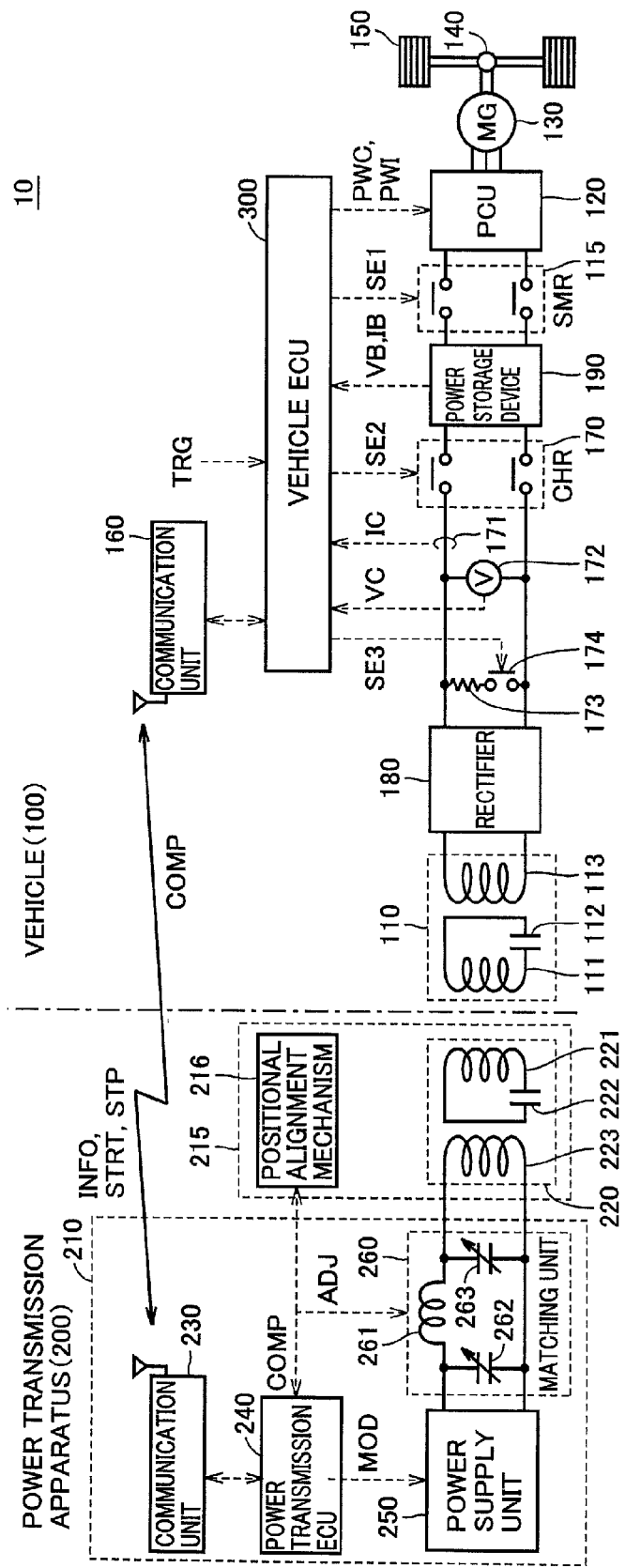
FIG. 6 is a detailed configuration diagram of the power transmission and reception system 10 shown in FIG. 1.

FIG. 6 is a detailed configuration diagram of power transmission and reception system 10 shown in FIG. 1. Referring to FIG. 6, vehicle 100 includes, in addition to power reception unit 110 and communication unit 160, a rectifier 180, a charging relay (CHR) 170, a power storage device 190, a system main relay (SMR) 115, a power control unit PCU (Power Control Unit) 120, a motor generator 130, a motive power transmission gear 140, drive wheels 150, a vehicle ECU (Electronic Control Unit) 300 which is a controller, a current sensor 171, and a voltage sensor 172. Power reception unit 110 includes a secondary self-resonance coil 111, a capacitor 112, and a secondary coil 113.

While the present embodiment is described in connection with an electric vehicle given as an example of vehicle 100, the configuration of vehicle 100 is not limited to that of the electric vehicle as long as vehicle 100 is a vehicle which is capable of travelling using electric power stored in the power storage device. Other examples of vehicle 100 include the hybrid vehicle mounted with an engine, the fuel cell vehicle mounted with a fuel cell, and the like.

Secondary self-resonance coil 111 receives electric power from primary self-resonance coil 221 included in power transmission apparatus 200, through electromagnetic resonance using electromagnetic field.

As to secondary self-resonance coil 111, its number of turns and the coil-to-coil distance are set appropriately, based on the distance from primary self-resonance coil 221 of power transmission apparatus 200 as well as the resonance frequency of primary self-resonance coil 221 and secondary self-resonance coil 111, for example, so that the Q factor representing the strength of resonance between primary self-resonance coil 221 and secondary self-resonance coil 111 is larger (Q>100 for example) and so that the coupling coefficient (κ) or the like representing the degree of coupling between these coils is smaller (κ is 0.1 or less for example).

Capacitor 112 is connected to the two opposite ends of secondary self-resonance coil 111 and forms, together with secondary self-resonance coil 111, an LC resonance circuit. The capacitance of capacitor 112 is set appropriately in accordance with the inductance of secondary self-resonance coil 111 so that a predetermined resonance frequency is achieved. In the case where a stray capacitance of secondary self-resonance coil 111 itself provides a desired resonance frequency, capacitor 112 may not be provided in some cases.

Secondary coil 113 is provided coaxially with secondary self-resonance coil 111 and can be magnetically coupled with secondary self-resonance coil 111 through electromagnetic induction. Secondary coil 113 picks up electric power received by secondary self-resonance coil 111 through electromagnetic induction and outputs the electric power to rectifier 180.

Rectifier 180 rectifies AC power received from secondary coil 113 and outputs DC power obtained by the rectification to power storage device 190 through CHR 170. Rectifier 180 may be configured to include a diode bridge and a smoothing capacitor (they are not shown), for example. As rectifier 180, a so-called switching regulator which performs rectification by means of switching control can be used. However, in view of the fact that rectifier 180 may be included in power reception unit 110 and for the purpose of preventing malfunction of switching devices due to the generated electromagnetic field, rectifier 180 is more preferably a static rectifier like a diode bridge.

In the present embodiment, the DC power obtained through rectification by rectifier 180 is directly output to power storage device 190. In the case, however, where the DC voltage after the rectification is different from a charging voltage acceptable by power storage device 190, a DC/DC converter (not shown) may be provided between rectifier 180 and power storage device 190 for the purpose of voltage conversion.

To the output portions of rectifier 180, a load resistor 173 and a relay 174 connected in series to each other for the purpose of positional detection are connected. Until positional alignment between power transmission unit 220 and power reception unit 110 with respect to each other is completed, weak electric power is transmitted for use as a test signal from power transmission apparatus 200 to the vehicle. Relay 174 is controlled by a control signal SE3 from vehicle ECU 300. When the positional alignment is performed, relay 174 is set in an electrically conductive state.

Voltage sensor 172 is provided between electric power lines which form a pair connecting rectifier 180 and power storage device 190. Voltage sensor 172 detects the DC voltage on the secondary side of rectifier 180, namely the voltage received from power transmission apparatus 200, and outputs the value of detected voltage VC to vehicle ECU 300. Based on voltage VC, vehicle ECU 300 determines the electric power reception efficiency and outputs a positional alignment command to the power transmission apparatus through communication unit 160.

Current sensor 171 is provided on an electric power line connecting rectifier 180 and power storage device 190. Current sensor 171 detects charging current to power storage device 190 and outputs the value of detected current IC to vehicle ECU 300.

CHR 170 is electrically connected to rectifier 180 and power storage device 190. CHR 170 is controlled by a control signal SE2 from vehicle ECU 300 to switch between a state of allowing electric power to be supplied from rectifier 180 to power storage device 190 and a state of interrupting it.

Power storage device 190 is an electric power storage element configured to be chargeable and dischargeable. Power storage device 190 is configured to include, for example, a secondary battery such as lithium ion battery, nickel metal hydride battery, or lead battery, or a power storage element such as electrical double-layer capacitor.

Power storage device 190 is connected to rectifier 180 through CHR 170. Power storage device 190 stores the electric power received by power reception unit 110 and rectified by rectifier 180. Power storage device 190 is also connected to PCU 120 through SMR 115. Power storage device 190 supplies to PCU 120 electric power for generating force which drives the vehicle. Further, power storage device 190 stores electric power generated by motor generator 130. The output of power storage device 190 is approximately 200 V for example.

Power storage device 190 is mounted with a voltage sensor and a current sensor (they are not shown) for detecting voltage VB of power storage device 190 and current IB which is input to and output from power storage device 190, respectively. Respective values detected by them are output to vehicle ECU 300. Based on voltage VB and current IB, vehicle ECU 300 calculates the charging state (also referred to as "SOC (State Of Charge)") of power storage device 190.

SMR 115 is provided on electric power lines connecting power storage device 190 and PCU 120 to each other. SMR 115 is controlled by a control signal SE1 from vehicle ECU 300 to switch between a state of allowing electric power to be supplied between power storage device 190 and PCU 120 and a state of interrupting it.

PCU 120 includes a converter and an inverter (they are not shown). The converter is controlled by a control signal PWC from vehicle ECU 300 to convert the voltage from power storage device 190. The inverter is controlled by a control signal PWI from vehicle ECU 300 to drive motor generator 130 using the electric power converted by the converter.

Motor generator 130 is an AC rotating electric machine, and is for example a permanent-magnet synchronous motor including a rotor in which permanent magnets are embedded.

The output torque of motor generator 130 is transmitted through motive power transmission gear 140 to drive wheels 150 to cause vehicle 100 to travel. When vehicle 100 is regeneratively braked, motor generator 130 is capable of generating electric power from rotational force of drive wheels 150. The generated electric power is converted by PCU 120 into charging electric power for charging power storage device 190.

In the case of a hybrid vehicle mounted with an engine (not shown) in addition to motor generator 130, the engine and motor generator 130 are operated in coordination with each other to generate required force for driving the vehicle. In this case, the electric power generated from rotation of the engine can also be used to charge power storage device 190.

Communication unit 160 is a communication interface for performing radio communication between vehicle 100 and power transmission apparatus 200 as described above. Communication unit 160 outputs to power transmission apparatus 200 battery information INFO including the SOC of power storage device 190 that is provided from vehicle ECU 300. Communication unit 160 also outputs to power transmission apparatus 200 signals STRT and STP used for giving instructions to start and stop power transmission from power transmission apparatus 200.

Vehicle ECU 300 includes a CPU (Central Processing Unit), a memory device, and an input/output buffer (they are not shown in FIG. 6), receives a signal from each sensor or the like and outputs a control signal to each device, and controls vehicle 100 as well as each device. Control of them is not limited to processing by means of software and it may be processing by means of dedicated hardware (electronic circuit).

Receiving a charging start signal TRG given through user's operation or the like, vehicle ECU 300 outputs, to power transmission apparatus 200 through communication unit 160, signal STRT for giving an instruction to start electric power transmission based on the fact that a predetermined condition is met. Vehicle ECU 300 also outputs, to power transmission apparatus 200 through communication unit 160, signal STP for giving an instruction to stop electric power transmission based on the fact that power storage device 190 is in a full state of charge or in accordance with user's operation for example.

Power transmission apparatus 200 includes power supply apparatus 210, power transmission unit 220, and a positional alignment mechanism 216 for changing the position of power transmission unit 220. Positional alignment mechanism 216 and power transmission unit 220 are housed in housing 215 shown in FIG. 1.

Power supply apparatus 210 further includes, in addition to communication unit 230, a power transmission ECU 240 which is a controller, a power supply unit 250, and a matching unit 260. Power transmission unit 220 includes primary self-resonance coil 221, a capacitor 222, and a primary coil 223.

Power supply unit 250 is controlled by a control signal MOD from power transmission ECU 240 to convert electric power received from an AC power supply such as commercial power supply into high-frequency electric power. Power supply unit 250 then supplies to primary coil 223 through matching unit 260 the high-frequency electric power generated by the conversion.

Matching unit 260 is a circuit given for the purpose of impedance matching between power transmission apparatus 200 and vehicle 100. Matching unit 260 is configured to include an inductor 261 and variable capacitors 262, 263. Matching unit 260 is controlled by a control signal ADJ given from power transmission ECU 240 based on battery information INFO transmitted from vehicle 100, and the variable capacitors are adjusted so that the impedance of power transmission apparatus 200 matches that of vehicle 100. Matching unit 260 also outputs to power transmission ECU 240 a signal COMP indicating that impedance adjustment has been completed.

While FIG. 6 shows that matching unit 260 is provided on the power transmission side and no matching unit is provided on the power reception side, the system may be configured to have both the matching unit provided on the power reception side and the matching unit provided on the power transmission side, or configured to have the matching unit provided on the power reception side only.

Primary self-resonance coil 221 transfers electric power through electromagnetic resonance to secondary self-resonance coil 111 included in power reception unit 110 of vehicle 100.

As to primary self-resonance coil 221, its number of turns and the coil-to-coil distance are set appropriately, based on the distance from secondary self-resonance coil 111 of vehicle 100 as well as the resonance frequency of primary self-resonance coil 221 and secondary self-resonance coil 111, for example, so that the Q factor representing the strength of resonance between primary self-resonance coil 221 and secondary self-resonance coil 111 is larger (Q>100 for example) and so that κ representing the degree of coupling between these coils, for example is smaller (κ is 0.1 or less for example).

Capacitor 222 is connected to the two opposite ends of primary self-resonance coil 221 and forms, together with primary self-resonance coil 221, an LC resonance circuit. The capacitance of capacitor 222 is set appropriately in accordance with the inductance of primary self-resonance coil 221 so that a predetermined resonance frequency is achieved. In the case where a stray capacitance of primary self-resonance coil 221 itself provides a desired resonance frequency, capacitor 222 may not be provided in some cases.

Primary coil 223 is provided coaxially with primary self-resonance coil 221 and can be magnetically coupled with primary self-resonance coil 221 through electromagnetic induction. Primary coil 223 transmits to primary self-resonance coil 221 through electromagnetic induction, high-frequency electric power supplied through matching unit 260.

Communication unit 230 is a communication interface for performing radio communication between power transmission apparatus 200 and vehicle 100 as described above. Communication unit 230 receives battery information INFO as well as signals STRT and STP giving instructions to start and stop power transmission which are transmitted from communication unit 160 of vehicle 100, and outputs the above information to power transmission ECU 240.

Further, communication unit 230 outputs to power transmission ECU 240 a positional alignment command based on the result of determination of whether the electric power reception efficiency is increased or decreased, the determination being made by vehicle ECU 300 by means of voltage VC. Following the positional alignment command, power transmission ECU 240 controls positional alignment mechanism 216 to change the position of power transmission unit 220 in the fore-and-aft direction of the vehicle and in the right-and-left direction of the vehicle.

Communication unit 230 also receives, from power transmission ECU 240, signal COMP given from matching unit 260 and indicating that impedance adjustment has been completed, and outputs the signal to vehicle 100.

Power transmission ECU 240 includes a CPU, a memory device, and an input/output buffer (they are not shown in FIG. 1), receives a signal from each sensor or the like and outputs a control signal to each device, and controls each device in power supply apparatus 210. Control of them is not limited to processing by means of software and it may be processing by means of dedicated hardware (electronic circuit).

For transfer of electric power from power transmission apparatus 200 to vehicle 100, the relationship between power transmission unit 90 and power reception unit 91 described above with reference to FIGS. 4 and 5 is established. In the electric power transfer system in FIG. 6, the difference between the natural frequency of power transmission unit 220 and the natural frequency of the power reception unit 110 is ±10% or less of the natural frequency of power transmission unit 220 or the natural frequency of power reception unit 110. The natural frequencies of power transmission unit 220 and power reception unit 110 can be set so that the difference therebetween is within such a range, to thereby increase the electric power transfer efficiency. In contrast, if the above difference in natural frequency is larger than ±10%, the electric power transfer efficiency is lower than 10%, resulting in adverse effects such as a longer time taken for transfer of electric power.

The natural frequency of power transmission unit 220 (power reception unit 110) means an oscillation frequency when an electrical circuit (resonance circuit) which forms power transmission unit 220 (power reception unit 110) makes free oscillations. The natural frequency on condition that the damping force or the electrical resistance is zero in the electrical circuit (resonance circuit) which forms power transmission unit 220 (power reception unit 110) is also referred to as resonance frequency of power transmission unit 220 (power reception unit 110).

Power transmission unit 220 and power reception unit 110 wirelessly supply and receive electric power to and from each other through at least one of a magnetic field formed between power transmission unit 220 and power reception unit 110 and oscillates at a specific frequency and an electric field formed between power transmission unit 220 and power reception unit 110 and oscillates at a specific frequency. Coupling coefficient κ between power transmission unit 220 and power reception unit 110 is 0.1 or less, and power transmission unit 220 and power reception unit 110 are caused to resonate with each other through electromagnetic field to thereby transfer electric power from power transmission unit 220 to power reception unit 110.

Figure 7:
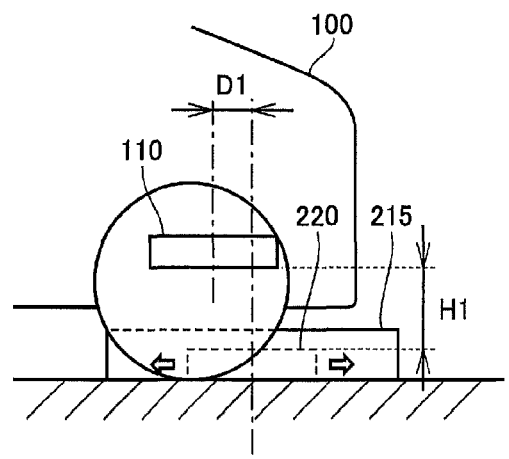
FIG. 7 is a diagram for illustrating positional misalignment and positional alignment between a power reception unit 110 and a power transmission unit 220.

FIG. 7 is a diagram for illustrating positional misalignment and positional alignment between power reception unit 110 and power transmission unit 220.

Referring to FIG. 7, a horizontal positional misalignment distance D1 between power reception unit 110 and power transmission unit 220 is the horizontal distance between the central axis of power reception unit 110 and the central axis of power transmission unit 220. Positional alignment mechanism 216 in FIG. 6 adjusts, in housing 215, the position of power transmission unit 220 so that horizontal positional misalignment distance D1 approaches zero.

Figure 8:
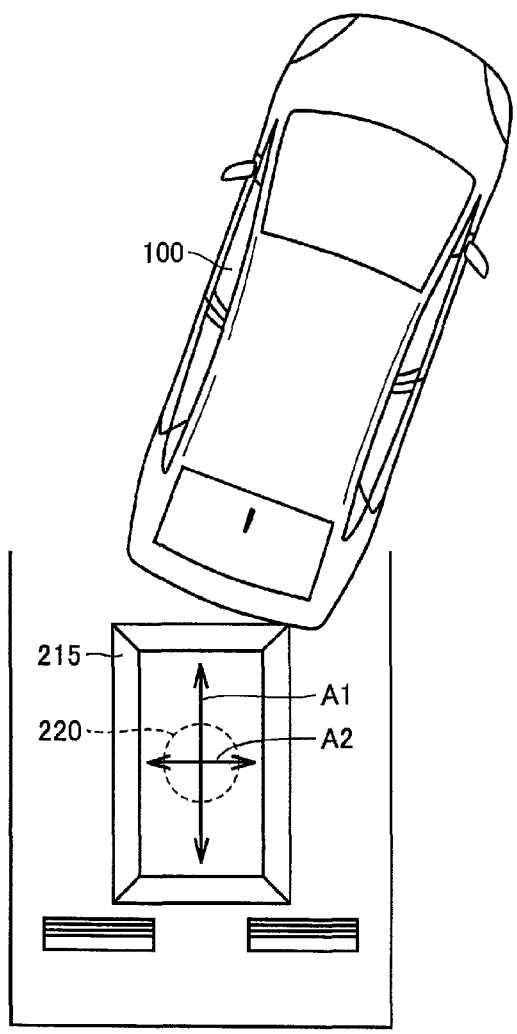
FIG. 8 is a diagram showing a state of a vehicle which is being parked, as seen from above the power reception unit.

FIG. 8 is a diagram showing a state of the vehicle which is being parked, as seen from above the power reception unit.

Referring to FIG. 8, positional alignment mechanism 216 in FIG. 6 is configured to be capable of moving the position of power transmission unit 220 in housing 215 in vehicle's fore-and-aft direction A1 and vehicle's right-and-left direction A2. As positional alignment mechanism 216, any of a variety of known mechanisms may be used. A so-called X-Y table or the like as disclosed in Japanese Patent Laying-Open No. 9-215211 for example may be used. While the range of positional adjustment is not particularly limited, it is preferable that a range of adjustment in vehicle's fore-and-aft direction A1 is larger than a range of adjustment in vehicle's right-and-left direction A2.

If, however, characteristics of the power transmission unit and those of the power reception unit are defined on the precondition that horizontal positional misalignment distance D1 shown in FIG. 7 is close to zero while the position where the vehicle is actually parked is misaligned to a large extent, the electric power reception efficiency indicated by an efficiency in receiving a test signal which is used for detecting the state of positional alignment significantly decreases, which makes it difficult to make positional alignment. Actually, the vehicle is more likely to be parked at a position where horizontal positional misalignment distance D1 is large to some extent, rather than parked at a position where horizontal positional misalignment distance D1 is close to zero.

In view of the above, the present embodiment sets power transmission and reception characteristics of the power transmission unit and the power reception unit on the precondition that positional misalignment distance D1 is large to some extent at the time when positional alignment is started, and changes the settings of the power transmission and reception characteristics in response to the fact that positional misalignment distance D1 has fallen in a certain range. The power transmission and reception characteristics can be changed by matching unit 260.

Figure 9:
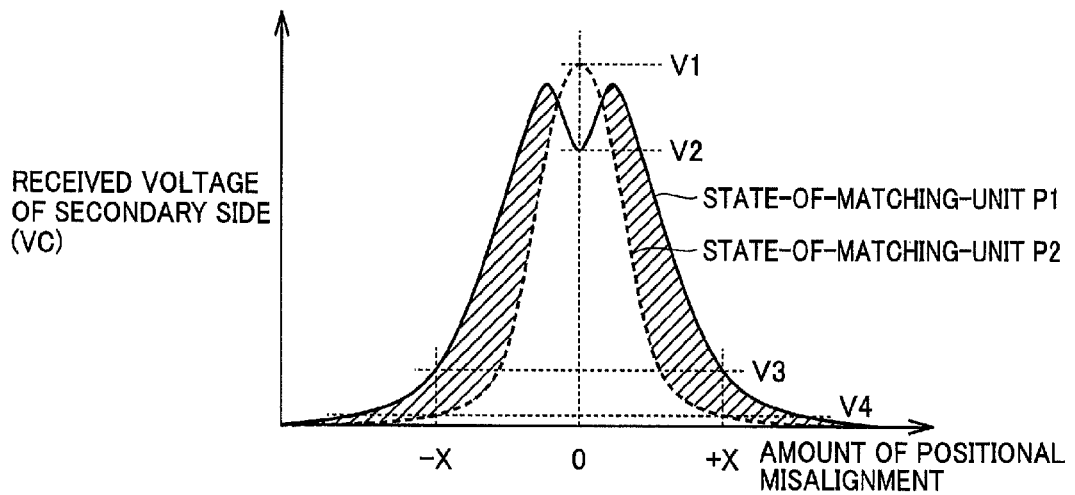
FIG. 9 is a diagram for illustrating how a power transmission and reception characteristic, which represents a relationship between an amount of positional misalignment and a voltage received by the secondary side, is changed depending on the state of a matching unit.

FIG. 9 is a diagram for illustrating how a power transmission and reception characteristic, which represents a relationship between an amount of positional misalignment and a voltage received by the secondary side, is changed depending on the state of the matching unit.

Referring to FIG. 9, in the case of a state-of-matching-unit P2, received voltage VC which is the voltage received by the secondary side is a peak voltage V1 when the positional misalignment amount is zero. As the positional misalignment amount deviates from zero, received voltage VC of the secondary side sharply decreases toward zero.

In contrast, in the case of a state-of-matching-unit P1, received voltage VC of the secondary side is not the peak voltage but a lower voltage V2 when the positional misalignment amount is zero, and voltage VC reaches the peak for two positional misalignment amounts which deviate slightly from zero. This peak voltage is higher than voltage V2 and lower than voltage V1.

For positional misalignment amounts of +X and −X, received voltage VC of the secondary side is a lower voltage V4 in the case of state-of-matching-unit P2, and received voltage VC of the secondary side is a voltage V3 in the case of state-of-matching unit P1.

Therefore, if the positional misalignment amount is out of a range of −X to +X and only the state-of-matching-unit P2 is used, the received voltage is low and thus a first scanning in the vehicle's fore-and-aft direction may not be enough to determine where the vehicle should be parked. In this case, it is necessary to repeat scanning in the vehicle's fore-and-aft direction until the received voltage is made large enough to determine where the power transmission unit should be positioned, by changing the position of the transmission unit several times in the vehicle's right-and-left direction, which takes a considerable time.

In view of the above, in the present embodiment, positional alignment is performed in such a manner that makes rough positional alignment by means of state-of-matching-unit P1 and makes fine positional adjustments by means of state-of-matching-unit P2, Namely, for the rough positional alignment, setting of the matching unit is made in such a way to enable the voltage in a wider range to be received so that the voltage can be received even at a far position. In other words, setting of the matching unit is made so that a predetermined voltage can be received even if the positional misalignment amount is large. For the fine positional adjustments, setting of the matching unit is made so that the voltage can only be received at a closer position. In other words, setting of the matching unit is made so that the received voltage is higher as the positional misalignment amount is smaller, as compared with the rough positional alignment. The setting of the matching unit is changed by changing the capacitance of variable-capacitance capacitor 262 or 263 in FIG. 6.

In order to make positional alignment with high precision, it is preferable that there is one voltage peak for state-of-matching-unit P2.

Figure 10:
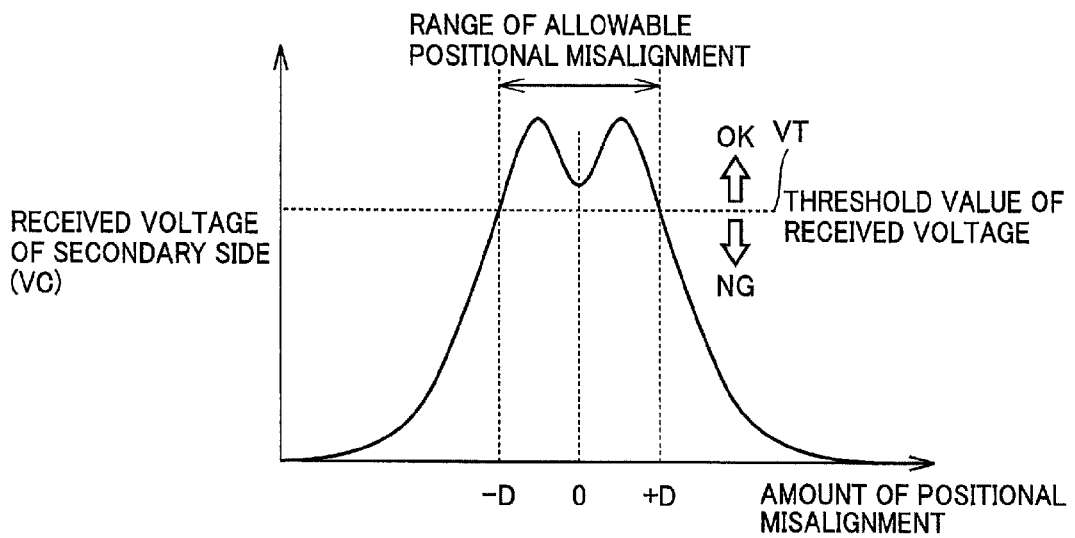
FIG. 10 is a diagram for illustrating how a threshold value of the received voltage is set for a state-of-matching-unit P1.

FIG. 10 is a diagram for illustrating how a threshold value of the received voltage is set for state-of-matching-unit P1. Referring to FIG. 10, a range of allowable positional misalignment of −D to +D is a range where the voltage can be received (positional alignment can be done) with the characteristic of state-of-matching-unit P2 in FIG. 9. Therefore, positional alignment using state-of-matching-unit P1 is done by adjusting the position of power transmission unit 220 by means of positional alignment mechanism 216 so that received voltage VC received by the secondary side is equal to or larger than a threshold value VT of the received voltage.

Figure 11:
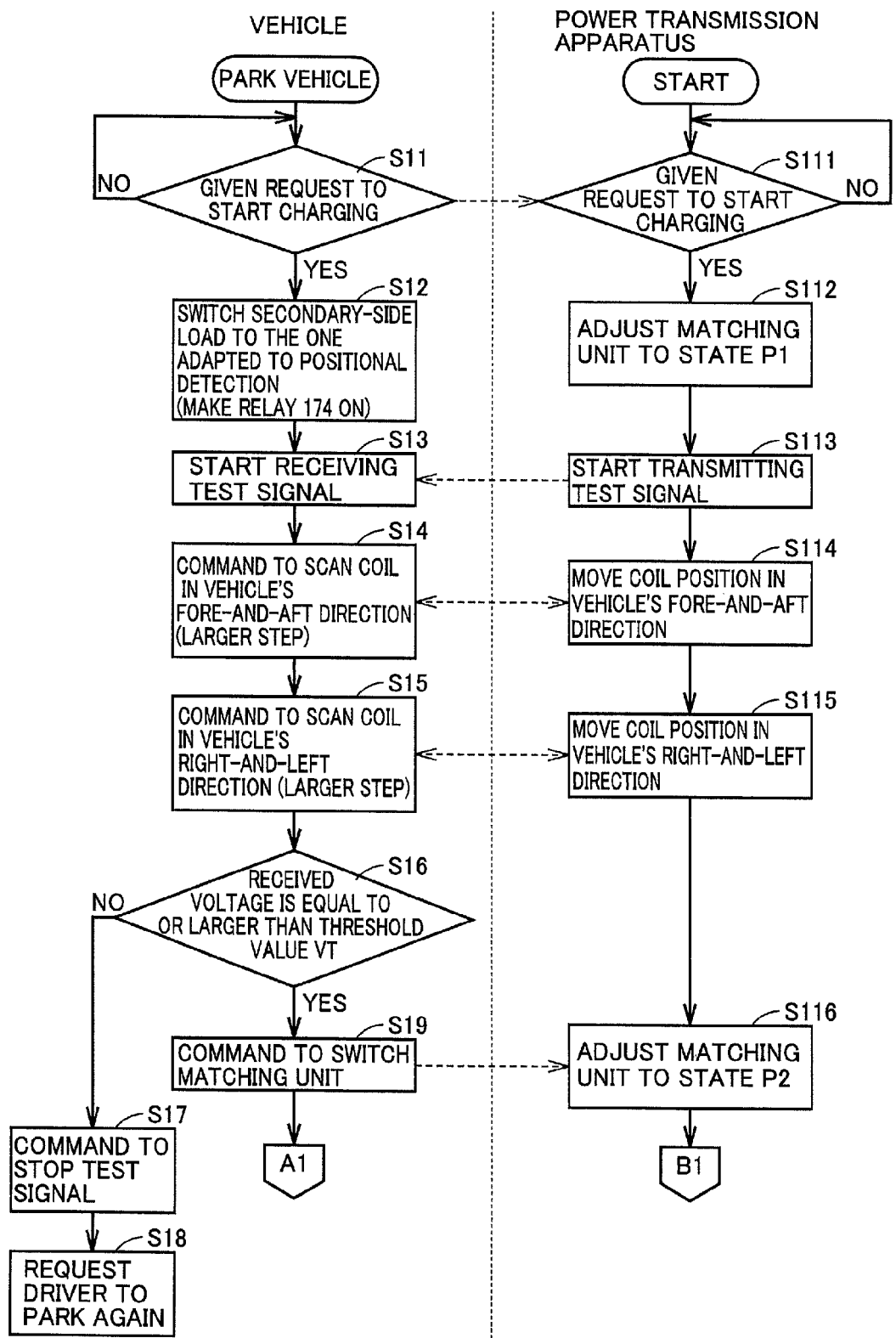
FIG. 11 is a flowchart (first half) for illustrating control executed by the vehicle and the power transmission apparatus for positional alignment between the power reception unit and the power transmission unit.

FIG. 11 is a flowchart (first half) for illustrating control executed by the vehicle and the power transmission apparatus for positional alignment between the power reception unit and the power transmission unit.

Referring to FIGS. 6 and 11, upon completion of parking of vehicle 100, the control in this flowchart is started. First, in step S11, vehicle ECU 300 determines whether or not a request to start charging has been given. The request to start charging is given for example by operation of a charging start button of the vehicle.

In power transmission apparatus 200, power transmission ECU 240 determines in step S111 whether or not the request to start charging has been transmitted from the vehicle.

When the request to start charging has not been given in step S11, the operation in step S11 is performed again. When the request to start charging has been given in step S11, the process proceeds to step S12. In step S12, vehicle ECU 300 switches the secondary-side load to the one adapted to positional detection. Specifically, vehicle ECU 300 uses control signal SE2 to make CHR 170 OFF and thereby disconnect power storage device 190 from rectifier 180 and also uses control signal SE3 to make relay 174 electrically conductive to thereby connect load resistor 173 to rectifier 180.

Meanwhile, in power transmission apparatus 200, the operation in step S111 is performed again when the request to start charging is not detected in step S111. When the request to start charging is detected in step S111, the process proceeds to step S112. In step S112, power transmission ECU 240 sets the state of matching unit 260 to state-of-matching-unit P1 in FIG. 9. Accordingly, a wider range of the position can be detected.

After this, in step S113, transmission of the test signal from power transmission apparatus 200 to vehicle 100 is started. As the test signal, electric power weaker than that for charging is transmitted from power transmission unit 220 to the power reception unit.

In response to this, power reception unit 110 in the vehicle starts receiving the test signal in step S13. In step S14, vehicle ECU 300 outputs to power transmission apparatus 200 a command to scan the coil position in the vehicle's fore-and-aft direction. At this time, one step of movement (a unit amount of movement) is larger than the step in later step S20. Following this command, power transmission ECU 240 of power transmission apparatus 200 causes, in step S114, positional alignment mechanism 216 to move the coil position in the vehicle's fore-and-aft direction step by step. Since the range of scanning in the vehicle's fore-and-aft direction is larger than that in the vehicle's right-and-left direction, positional alignment is firstly done in the vehicle's fore-and-aft direction. Positional alignment is done so that the position of power transmission unit 220 in the vehicle's fore-and-aft direction is a position that causes received voltage VC of the secondary side to reach its peak.

After completion of rough positional alignment in the vehicle's fore-and-aft direction in steps S14 and S114, subsequently rough positional alignment in the vehicle's right-and-left direction is done in steps S15 and S115.

In step S15, vehicle ECU 300 outputs to power transmission apparatus 200 a command to scan the coil position in the vehicle's right-and-left direction. At this time, one step of movement is larger than that in later step S21. Following this command, in step S115, power transmission ECU 240 of power transmission apparatus 200 causes positional alignment mechanism 216 to move the coil position in the vehicle's right-and-left direction step by step. Positional alignment is done so that the position of power transmission unit 220 in the vehicle's right-and-left direction is a position that causes received voltage VC of the secondary side to reach its peak.

When rough scanning of the coil position in the vehicle's fore-and-aft direction and the vehicle's right-and-left direction is ended, it is determined in step S16 whether or not received voltage VC is a threshold value VT or more. Thus, as described above with reference to FIG. 10, it is found whether the vehicle position falls in the range of allowable positional misalignment (the range for which positional alignment can be done).

When received voltage VC is not equal to or larger than threshold value VT in step S16, the process proceeds to step S17 in which vehicle ECU 300 outputs a command to stop the test signal to power transmission apparatus 200. In step S18, vehicle ECU 300 requests a driver to park the vehicle again, using means for notice such as liquid crystal display or speaker.

In contrast, when received voltage VC is equal to or larger than threshold value VT in step S16, the process proceeds to step S19 in which vehicle ECU 300 outputs to power transmission apparatus 200 a command to switch the matching unit. In response to this, in step S116, power transmission ECU 240 of power transmission apparatus 200 adjusts the circuit constant of matching unit 260 so that the state of matching unit 260 is switched to state-of-matching-unit P2 in FIG. 9. The circuit constant is adjusted by changing the capacitance value of variable-capacitance capacitor 262 or 263 of matching unit 260 by means of control signal ADJ.

Figure 12:
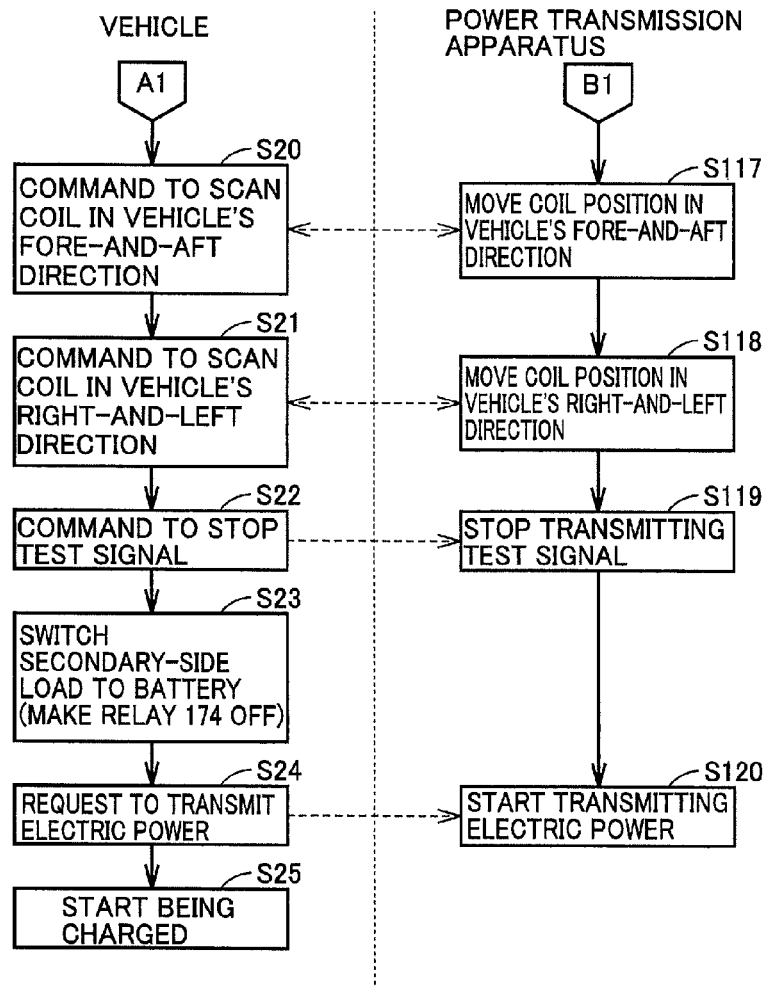
FIG. 12 is a flowchart (second half) for illustrating control executed by the vehicle and the power transmission apparatus for positional alignment between the power reception unit and the power transmission unit.

FIG. 12 is a flowchart (second half) for illustrating control executed by the vehicle and the power transmission apparatus for positional alignment between the power reception unit and the power transmission unit.

Referring to FIGS. 11 and 12, after the operation in step S19 in the vehicle, the operation in step S20 is performed. In power transmission apparatus 200, the operation in step S117 is performed after the operation in step S116.

In step S20, vehicle ECU 300 outputs to power transmission apparatus 200 a command to scan the coil position in the vehicle's fore-and-aft direction. One step of movement at this time is smaller than that in step S15. Following this command, power transmission ECU 240 of power transmission apparatus 200 causes in step S117 positional alignment mechanism 216 to move the coil position in the vehicle's fore-and-aft direction step by step. Since the range of scanning in the vehicle's fore-and-aft direction is larger than that in the vehicle's right-and-left direction, positional alignment in the vehicle's fore-and-aft direction is done first. Positional alignment is done so that the position of power transmission unit 220 in the vehicle's fore-and-aft direction is a position that causes received voltage VC of the secondary side to reach its peak.

Upon completion of fine positional alignment in the vehicle's fore-and-aft direction in steps S20 and S117, subsequently fine positional alignment in the vehicle's right-and-left direction is performed in steps S21 and S118.

In step S21, vehicle ECU 300 outputs to power transmission apparatus 200 a command to scan the coil position in the vehicle's right-and-left direction. At this time, one step of movement is smaller than that in step S15. Following this command, power transmission ECU 240 of power transmission apparatus 200 causes, in step S118, positional alignment mechanism 216 to move the coil position in the vehicle's right-and-left direction step by step. Positional alignment is done by adjusting the position of power transmission unit 220 in the vehicle's right-and-left direction so that received voltage VC received by the secondary side reaches its peak.

After the fine positional alignment in the vehicle's right-and-left direction in steps S21 and S118, vehicle ECU 300 outputs to power transmission apparatus 200 a command to stop the test signal in step S21. In response to this, power transmission ECU 240 stops transmitting the test signal in step S119.

In step S23, vehicle ECU 300 uses control signal SE3 to make relay 174 OFF and uses control signal SE2 to make CHR 170 electrically conductive, and thereby switch the secondary-side load from load resistor 173 to power storage device 190.

In step S24, vehicle ECU 300 requests power transmission apparatus 200 to transmit electric power. In power transmission apparatus 200, power transmission ECU 240 responds to this to cause in step S120 power supply unit 250 to transmit electric power larger than the test signal. In vehicle 100, power storage device 190 starts being charged in step S25.

As heretofore described, in the present embodiment, the parameter of the resonance system is set for rough positional alignment so that the range of electric power receivable by the power reception unit is a wider range and accordingly ensures a wider range of first scanning.

Then, for the fine positional alignment, the parameter of the resonance system is set so that there is one peak of the received voltage and accordingly fine adjustments can easily be made. It should be noted that the state may not necessarily be switched in such a way to provide one peak of the received voltage. Rather, the state may be switched in such a way to provide an increased peak value with two peaks of the received voltage as they are, since this is effective for enhancement of the efficiency.

While the flowcharts in FIGS. 11 and 12 show an example where vehicle ECU 300 which is a controller of vehicle 100 gives a command and power transmission ECU 240 which is a controller of power transmission apparatus 200 follows the command to perform transmission/reception of electric power and/or change the coil position, respective functions of vehicle ECU 300 and power transmission ECU 240 may be changed as appropriate. For example, their functions may be changed so that power transmission ECU 240 causes vehicle ECU 300 to transmit the value of received voltage VC and then power transmission ECU 240 makes determination for positional alignment.

Figure 13:
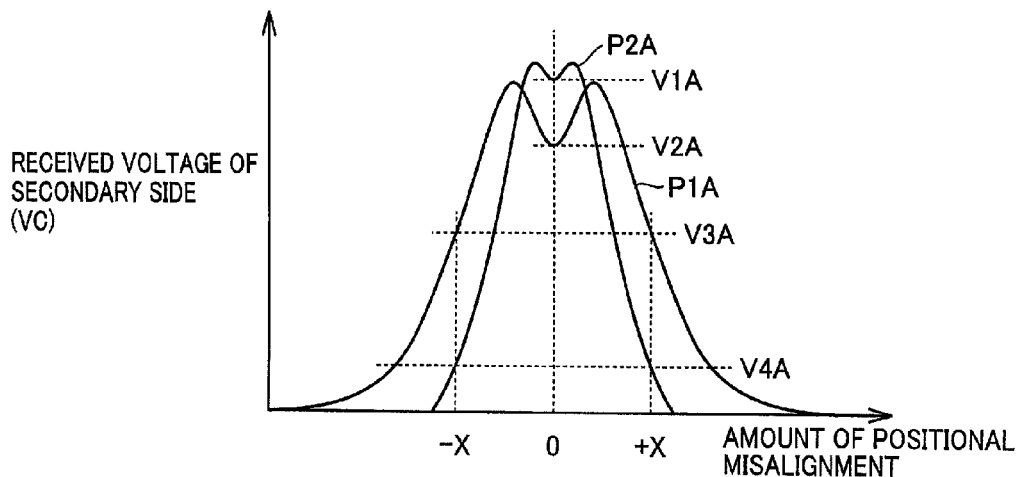
FIG. 13 is a diagram for illustrating an example where fine positional alignment is made with two received-voltage peaks.

FIG. 13 is a diagram for illustrating an example where fine positional alignment is made with two received-voltage peaks.

Referring to FIG. 13, a description will be given of how a power transmission and reception characteristic, which represents a relationship between an amount of positional misalignment and a voltage received by the secondary side, is changed depending on the state of the matching unit.

For initial rough positional alignment, the circuit constant of the matching unit is set to a state-of-matching-unit P1A. In the case of state-of-matching-unit P1A, received voltage VC received by the secondary side is not a peak voltage but a lower voltage V2A when the amount of positional misalignment is zero, while voltage VC has two peaks respectively for the amounts of positional misalignment that slightly deviate from zero.

For the subsequent fine positional alignment, the circuit constant of the matching unit is set to a state-of-matching-unit P2A. In the case of state-of-matching-unit P2A as well, received voltage VC of the secondary side is a voltage V1A when the amount of positional misalignment is zero, while received voltage VC has two peaks respectively for the amounts of positional misalignment that slightly deviate from zero.

For the positional misalignment amounts +X and −X, received voltage VC of the secondary side is a lower voltage V4A in the case of state-of-matching-unit P2A, while received voltage VC of the secondary side is a voltage V3A in the case of state-of-matching-unit P1A.

In view of the above, positional alignment is performed in such a manner that makes rough positional alignment by means of state-of-matching-unit P1A so that the amount of positional misalignment falls in a range of +X to −X, and makes fine positional adjustments by means of state-of-matching-unit P2A so that the amount of positional misalignment approaches zero. Namely, for the rough positional alignment, setting of the matching unit is made so that the voltage can be received even at a far position and, for the fine positional adjustments, setting of the matching unit is made so that the voltage can only be received at a closer position. The setting of the matching unit is changed by changing the capacitance of variable-capacitance capacitor 262 or 263 in FIG. 6.

Thus, the characteristic may not necessarily be changed from the characteristic with two peaks to the characteristic with one peak as shown in FIG. 9. Rather, two states each having two peaks may be used. State-of-matching-unit P1A with a wider range and a lower power-reception efficiency and state-of-matching-unit P2A with a narrower range and a higher power-reception efficiency may be used in combination to suitably make positional alignment between power reception unit 110 and power transmission unit 220.

While the present embodiment provides an example where power transmission apparatus 200 includes matching unit 260 as means for changing the range of receivable electric power that can be received by the power reception unit, means for changing the range of receivable electric power may be different from this. For example, a) a mechanism changing the distance between the electromagnetic induction coil and the resonance coil, b) a mechanism changing the distance between a shield around the resonance coil and the resonance coil, c) in the case where the DC voltage of rectifier 180 is converted and fed to power storage device 190, means for changing the current/voltage ratio (or voltage step-up ratio) of a DC/DC converter used for the aforementioned DC voltage conversion, d) means for changing the output electric power of power supply unit 250, or the like, may be used as the means for changing the range of receivable electric power.

Further, such means for changing the range of receivable electric power may be provided on either of the power transmission side and the power reception side, namely may be provided at any position on the power transmission and reception path from power transmission apparatus 200 to vehicle 100 which is a power reception apparatus.

While the positional misalignment has chiefly been described by way of example as misalignment in the horizontal direction with reference to FIG. 7, the positional misalignment is intended to include misalignment other than the horizontal misalignment.

Figure 14:
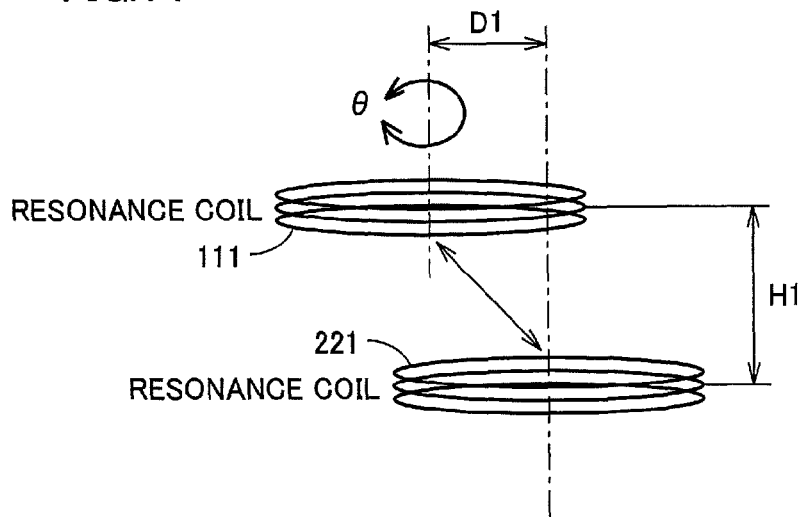
FIG. 14 is a diagram showing a first example arrangement of resonance coils, for illustrating positional misalignment.

FIG. 14 is a diagram showing a first example arrangement of resonance coils, for illustrating positional misalignment. As shown in FIG. 14, the positional relation between a resonance coil 111 and a resonance coil 221 is defined by a horizontal misalignment amount D1, a height H1, and a rotational angle θ. In the case where the coils are circular in shape, rotational angle θ does not have a significant influence. In the case where the shape of the coils is a different shape (rectangular, polygonal, or the like), rotational angle θ has a greater influence on the transfer efficiency.

Figure 15:
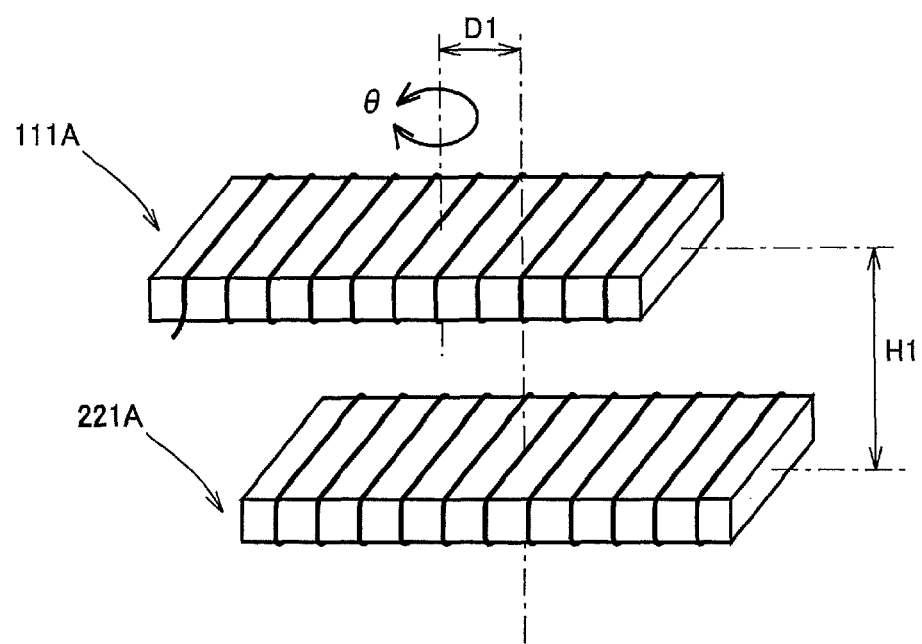
FIG. 15 is a diagram showing a second example arrangement of resonance coils, for illustrating positional misalignment.

FIG. 15 is a diagram showing a second example arrangement of resonance coils, for illustrating positional misalignment. FIG. 15 shows by way of example a resonance coil 111A and a resonance coil 221A which are each formed of a wire wound around a flat-plate-shaped core material and are provided respectively as a power transmission unit and a power reception unit.

As shown in FIG. 15, the positional relationship between resonance coil 111A and resonance coil 221A is defined by a horizontal misalignment amount D1, a height H1, and a rotational angle θ.

Referring to FIGS. 14 and 15, the positional misalignment may be misalignment other than horizontal misalignment D1. The positional misalignment herein includes the following forms of misalignment:

(i) misalignment in the horizontal direction (referred to as misalignment in the X direction);

(ii) misalignment in the direction of height (referred to as misalignment in the H direction);

(iii) misalignment by rotational angle θ with respect to the central axis (referred to as misalignment in the rotational direction); and (iv) a state where the transmission unit and the reception unit are positionally misaligned with respect to each other in at least one of the X direction, the H direction, and the rotational direction, as compared with respective optimum positions which are defined as a state where the power transmission unit and the power reception unit are arranged in such a manner that can keep a predetermined power reception efficiency, in the case where a coil of a different shape from the circular shape is used as the transmission unit/reception unit; and (v) a state where the magnetic pole of the power transmission unit and the magnetic pole of the power reception unit are positionally misaligned with respect to each other in at least one of the X direction, the H direction, and the rotational direction, as compared with the above-described optimum positions.

Particularly in the case of resonance coils as shown in FIG. 15, the fact that the position of the power transmission unit and the position of the power reception unit are misaligned with respect to each other in at least one of the X direction, the H direction, and the rotational direction, relative to the condition that respective resonance coils are arranged in an optimum state, can be referred to as positional misalignment.

Finally, with reference again to the drawings, the present embodiment will be summarized. An aspect of the present embodiment is directed to a wireless power reception apparatus for wirelessly receiving electric power transferred from power transmission apparatus 200, As shown in FIGS. 1 and 6, power transmission apparatus 200 includes power transmission unit 220 and power supply unit 250 supplying AC power to the power transmission unit. The wireless power reception apparatus includes power reception unit 110 capable of wirelessly receiving electric power from the power transmission unit, and a control unit (vehicle ECU 300) performing control for positional alignment between power reception unit 110 and power transmission unit 220 and for reception of electric power after the positional alignment. The magnitude of electric power received by power reception unit 110 from power transmission unit 220 is used for positional alignment between power reception unit 110 and power transmission unit 220. The control unit (vehicle ECU 300) sets a parameter of a power transmission and reception path so that a power receivable range that can be received by power reception unit 110 at any time while positional alignment is done is wider than that when electric power is received after the positional alignment.

Accordingly for both the case where electric power is wirelessly transmitted and received by means of the resonance technique and the case where electric power is wirelessly transmitted and received by means of electromagnetic induction, positional alignment is facilitated. While FIGS. 1 to 6 give an example of the resonance technique, the range of receivable electric power can be changed as well even in the case of wireless charging by means of electromagnetic induction by, for example, providing a variable capacitance of a capacitor connected to an electromagnetic induction coil.

As to when the range of receivable electric power should be set to a wide range, the flowcharts in FIGS. 11 and 12 show an example where it is set to a wide range after completion of parking. The range, however, may be set to a wide range when the vehicle is parked. In the case where the parking position is determined while the intensity of the received electric power is monitored, a wide range of receivable electric power may be used when the vehicle is parked. Namely, any time while positional alignment is done means the time when positional alignment, which includes an operation of parking, is started and any time during the positional alignment.

Preferably, as illustrated by means of state-of-matching-unit P1 in FIG. 9, power reception unit 110 and power transmission unit 220 are configured to be capable of providing a transfer-efficiency characteristic that the transfer efficiency exhibits its peak when respective central axes of power reception unit 110 and power transmission unit 220 are arranged in horizontal positional misalignment with respect to each other, and such a transfer-efficiency characteristic is used for positional alignment.

More preferably, before an amount of positional misalignment in the horizontal direction (D1 in FIG. 7) between the central axis of power reception unit 110 and the central axis of power transmission unit 220 becomes equal to or less than a predetermined value, the control unit sets the parameter of the power transmission and reception path so that the transfer efficiency from power transmission unit 220 to power reception unit 110 exhibits a first characteristic (state-of-matching-unit P1 in FIG. 9; state-of-matching-unit P1A in FIG. 13) and, after the amount of positional misalignment becomes equal to or less than the predetermined value, the control unit sets the parameter of the power transmission and reception path so that the transfer efficiency from power transmission unit 220 to power reception unit 110 exhibits a second characteristic (state-of-matching-unit P2 in FIG. 9; state-of-matching-unit P2A in FIG. 13) providing improved sensitivity to positional misalignment in a narrower range, relative to the first characteristic.

Still more preferably, the first characteristic (state-of-matching-unit P1 in FIG. 9) is a characteristic that the transfer efficiency exhibits a peak when power reception unit 110 and power transmission unit 220 are arranged with respective central axes positionally misaligned with respect to each other in the horizontal direction, and the second characteristic (state-of-matching-unit P2 in FIG. 9) is a characteristic that the transfer efficiency exhibits a peak when power reception unit 110 and power transmission unit 220 are arranged with respective central axes positionally coincident with each other in the horizontal direction.

Still more preferably, power transmission apparatus 200 or the wireless power reception apparatus (vehicle 100) further includes an impedance adjustment unit for changing the characteristic of the power transmission and reception path. The control unit (vehicle ECU 300) instructs the impedance adjustment unit to switch the transfer efficiency from the first characteristic to the second characteristic.

While the impedance adjustment unit is shown in FIG. 6 by way of example as being implemented by matching unit 260 provided in power transmission apparatus 200, the impedance adjustment unit may be any other than it. For example, a) a mechanism changing the distance between the electromagnetic induction coil and the resonance coil, b) a mechanism changing the distance between a shield around the resonance coil and the resonance coil, c) in the case where the DC voltage of rectifier 180 is converted to be fed to power storage device 190, means for changing the current/voltage ratio (or voltage step-up ratio) of the DC/DC converter used for the aforementioned DC voltage conversion, d) means for changing the output electric power of power supply unit 250, or the like, may be used as the impedance adjustment unit.

More preferably, power transmission apparatus 200 further includes matching unit 260 provided between power transmission unit 220 and power supply unit 250 for adjusting the impedance of power transmission apparatus 200, and a positional alignment mechanism 216 moving the position of power transmission unit 220. Vehicle ECU 300 changes the circuit constant of matching unit 260 for switching the transfer efficiency from the first characteristic to the second characteristic.

Preferably, as shown in FIG. 6, power transmission apparatus 200 further includes positional alignment mechanism 216 moving the position of power transmission unit 220. As shown in FIGS. 8, 11, and 12, the control unit (vehicle ECU 300) instructs positional alignment mechanism 216 to make an adjustment by moving the position of power transmission unit 220 in the direction of travel of vehicle 100 and thereafter make an adjustment by moving the position of power transmission unit 220 in the right-and-left direction of vehicle 100.

Preferably, power reception unit 110 is configured so that a difference in natural frequency between power reception unit 110 and power transmission unit 220 is within ±10%.

More preferably, a coupling coefficient between power reception unit 110 and power transmission unit 220 is 0.1 or less.

More preferably, power transmission unit 220 transmits electric power to power reception unit 110 through at least one of a magnetic field formed between power reception unit 110 and power transmission unit 220 and oscillates at a specific frequency, and an electric field formed between power reception unit 110 and power transmission unit 220 and oscillates at a specific frequency.

Another aspect of the present invention is directed to a wireless power transmission apparatus for wirelessly transmitting electric power to a power reception apparatus (vehicle 100). The power reception apparatus includes power reception unit 110 and an electrical load apparatus (power storage device 190, PCU 120) receiving electric power from power reception unit 110. Wireless power transmission apparatus 200 includes power transmission unit 220 capable of wirelessly transmitting electric power to power reception unit 110, power supply unit 250 supplying AC power to power transmission unit 220, and a control unit (power transmission ECU 240) performing control for positional alignment between power reception unit 110 and power transmission unit 220 and for reception of electric power after the positional alignment. The magnitude of electric power received by power reception unit 110 from power transmission unit 220 is used for positional alignment between power reception unit 110 and power transmission unit 220. The control unit (power transmission ECU 240) sets a parameter of a power transmission and reception path so that a power receivable range, as illustrated by state-of-matching-unit P1 in FIG. 9, that can be received by power reception unit 110 at any time while positional alignment is done is wider than that, as illustrated by state-of-matching-unit P2 in FIG. 9, when electric power is received after the positional alignment.

Preferably, power transmission unit 220 is configured to be able to provide a higher transfer efficiency (two voltage peaks higher than received voltage V2) which is exhibited when power transmission unit 220 is arranged at a position which is positionally displaced from a target position with respect to power reception unit 110, than the transfer efficiency (received voltage V2) which is exhibited when power transmission unit 220 is arranged at the target position with respect to power reception unit 110. The level of the electric power transmitted from power transmission unit 220 to power reception unit 110 and received by power reception unit 110 is used for positional alignment between power transmission unit 220 and power reception unit 110.

While the present embodiment has been described in connection with the case as shown in FIG. 6 where power transmission apparatus 200 includes positional alignment mechanism 216 for moving the position of power transmission unit 220, vehicle 100 may include a positional alignment mechanism capable of moving the position of power reception unit 110.

Further, while the present embodiment provides by way of example the power transmission unit and the power reception unit each including an electromagnetic induction coil, the present invention is also applicable to a resonance-type wireless power transmission and reception apparatus including no electromagnetic induction coil (resonance-type wireless power transmission and reception apparatus using only self-resonance coils). Namely, the fact that means for providing a variable range of receivable electric power of the power reception unit is placed at any position on the power transmission and reception path and the range of receivable electric power is made wider at any time while positional alignment between the power transmission unit and the power reception unit is done is applicable to a resonance-type wireless power transmission and reception apparatus including no electromagnetic induction coil, as well as a wireless power transmission and reception apparatus transmitting and receiving electric power by means of a different technique (electromagnetic induction, microwave, light, or the like) other than the resonance type.

It should be construed that the embodiments disclosed herein are by way of illustration in all respects, not by way of limitation. It is intended that the scope of the present invention is defined by claims, not by the description above, and encompasses all modifications and variations equivalent in meaning and scope to the claims.

REFERENCE SIGNS LIST 10 power transmission and reception system; 100 vehicle; 91, 110 power reception unit; 111, 111A, 340 secondary self-resonance coil; 112, 222 capacitor; 113, 350 secondary coil; 130 motor generator; 140 motive power transmission gear; 150 drive wheel; 160, 230 communication unit; 171 current sensor; 172 voltage sensor; 173 load resistor; 174 relay; 180 rectifier; 190 power storage device; 200 power transmission apparatus; 210 high-frequency power supply apparatus; 212 connector; 215 housing; 216 positional alignment mechanism; 90, 220 power transmission unit; 221, 221A, 330 primary self-resonance coil; 223, 320 primary coil; 240 power transmission ECU; 250 power supply unit; 260 matching unit; 261 inductor; 262, 263 variable-capacitance capacitor; 300 vehicle ECU; 310 high-frequency power supply; 360 load; PCU power control unit

The invention claimed is:

1. A wireless power reception apparatus for wirelessly receiving electric power transferred from a power transmission apparatus, the power transmission apparatus including a power transmitter and a power supply supplying AC power to the power transmitter, the wireless power reception apparatus comprising:
a power receiver capable of wirelessly receiving electric power from the power transmitter; and
a controller performing positional alignment between the power receiver and the power transmitter, the controller:
performing a first adjustment for arranging the power transmitter and the power receiver at respective predetermined position;
performing a second adjustment for arranging the power transmitter and the power receiver at respective positions that produce a higher electric power reception efficiency than the positions where the power transmitter and the power receiver are arranged by the first adjustment; and
setting an impedance of the power transmitter or the power receive so that a power receivable range that can be received by the power receiver when the first adjustment is performed is wider than a power receivable range that can be received by the power receiver when the second adjustment is performed.

2. The wireless power reception apparatus according to claim 1, wherein
before an amount of misalignment due to positional misalignment between the power receiver and the power transmitter becomes equal to or less than a predetermined value, the controller sets the impedance of the power transmitter or the power receiver so that a transfer efficiency from the power transmitter to the power receiver exhibits a first characteristic and,
after the amount of misalignment becomes equal to or less than the predetermined value, the controller sets the impedance of the power transmitter or the power receiver so that the transfer efficiency from the power transmitter to the power receiver exhibits a second characteristic providing improved sensitivity to positional misalignment in a narrower range, relative to the first characteristic.

3. The wireless power reception apparatus according to claim 2, wherein
the first characteristic is that the transfer efficiency exhibits a peak when the power receiver and the power transmitter are arranged with a central axis of the power receiver and a central axis of the power transmitter positionally misaligned with respect to each other in a horizontal direction, and
the second characteristic is that the transfer efficiency exhibits a peak when the power receiver and the power transmitter are arranged with the central axis of the power receiver and the central axis of the power transmitter positionally coincident with each other in the horizontal direction.

4. The wireless power reception apparatus according to claim 2, wherein
the power transmission apparatus or the wireless power reception apparatus further comprises an impedance adjuster for changing a characteristic of the power transmitter or the power receiver, and
the controller instructs the impedance adjuster to switch the transfer efficiency from the first characteristic to the second characteristic.

5. The wireless power reception apparatus according to claim 1, wherein
the power transmission apparatus further comprises a positional alignment mechanism moving the position of the power transmitter, and
the controller instructs the positional alignment mechanism to make an adjustment by moving the position of the power transmitter in a direction of travel of a vehicle and thereafter make an adjustment by moving the position of the power transmitter in a right-and-left direction of the vehicle.

6. The wireless power reception apparatus according to claim 1, wherein the power receiver is configured so that a difference in natural frequency between the power receiver and the power transmitter is within ±10%.

7. The wireless power reception apparatus according to claim 1, wherein a coupling coefficient between the power receiver and the power transmitter is 0.1 or less.

8. The wireless power reception apparatus according to claim 1, wherein the power transmitter transmits electric power to the power receiver through at least one of a magnetic field formed between the power receiver and the power transmitter that oscillates at a specific frequency, and an electric field formed between the power receiver and the power transmitter that oscillates at a specific frequency.

9. A wireless power transmission apparatus for wirelessly transmitting electric power to a power reception apparatus, the power reception apparatus including a power receiver and an electrical load apparatus receiving electric power from the power receiver, the wireless power transmission apparatus comprising:
a power transmitter capable of wirelessly transmitting electric power to the power receiver;
a power supply supplying AC power to the power transmitter; and
a controller performing positional alignment between the power receiver and the power transmitter, the controller:
performing a first adjustment for arranging the power transmitter and the power receive at respective predetermined positions;
performing a second adjustment for arranging the power transmitter and the power receiver at respective positions that produce a higher electric power reception efficiency than the positions where the power transmitter and the power receiver are arranged by the first adjustment; and
setting an impedance of the power transmitter or the power receiver so that a power receivable range that can be received by the power receiver when the first adjustment is performed is wider than a power receivable range that can be received by the power receiver when the second adjustment is performed.

10. The wireless power transmission apparatus according to claim 9, wherein before an amount of misalignment due to positional misalignment between the power receiver and the power transmitter becomes equal to or less than a predetermined value, the controller sets the impedance of the power transmitter or the power receiver so that a transfer efficiency from the power transmitter to the power receiver exhibits a first characteristic and, after the amount of misalignment becomes equal to or less than the predetermined value, the controller sets the impedance of the power transmitter or the power receiver so that the transfer efficiency from the power transmitter to the power receiver exhibits a second characteristic providing improved sensitivity to positional misalignment in a narrower range, relative to the first characteristic.

11. The wireless power transmission apparatus according to claim 10, wherein the first characteristic is that the transfer efficiency exhibits a peak when the power receiver and the power transmitter are arranged with a central axis of the power receiver and a central axis of the power transmitter positionally misaligned with respect to each other in a horizontal direction, and the second characteristic is that the transfer efficiency exhibits a peak when the power receiver and the power transmitter are arranged with the central axis of the power receiver and the central axis of the power transmitter positionally coincident with each other in the horizontal direction.

12. The wireless power transmission apparatus according to claim 10, wherein the wireless power transmission apparatus or the power reception apparatus further comprises an impedance adjuster for changing a characteristic of the power transmitter or the power receiver, and the controller instructs the impedance adjuster to switch the transfer efficiency from the first characteristic to the second characteristic.

13. The wireless power transmission apparatus according to claim 9, wherein the wireless power transmission apparatus further comprises a positional alignment mechanism moving the position of the power transmitter, and the controller instructs the positional alignment mechanism to make an adjustment by moving the position of the power transmitter in a direction of travel of a vehicle and thereafter make an adjustment by moving the position of the power transmitter in a right-and-left direction of the vehicle.

14. The wireless power transmission apparatus according to claim 9, wherein the power transmitter is configured so that a difference in natural frequency between the power transmitter and the power receiver is within ±10%.

15. The wireless power transmission apparatus according to claim 9, wherein a coupling coefficient between the power receiver and the power transmitter is 0.1 or less.

16. The wireless power transmission apparatus according to claim 9, wherein the power receiver receives electric power from the power transmitter through at least one of a magnetic field formed between the power receiver and the power transmitter that oscillates at a specific frequency, and an electric field formed between the power receiver and the power transmitter that oscillates at a specific frequency.

17. A wireless power transmission and reception system comprising:
    a wireless power transmission apparatus, including:
        a power transmitter; and
        a power supply supplying AC power to the power transmitter;
    a wireless power reception apparatus for wirelessly receiving electric power transferred from the wireless power transmission apparatus, the wireless power reception apparatus including:
        a power receiver capable of wirelessly receiving electric power from the power transmitter; and
        an electrical load apparatus using electric power received by the power receive; and
    a controller performing positional alignment between the power receiver and the power transmitter, the controller:
        performing a first adjustment for arranging the power transmitter and the power receiver at respective predetermined positions;
        performing a second adjustment for arranging the power transmitter and the power receiver at respective positions that produce a higher electric power reception efficiency than the positions where the power transmitter and the power receiver are arranged by the first adjustment; and
        setting an impedance of the power transmitter or the power receiver so that a power receivable range that can be received by the power receiver when the first adjustment is performed is wider than a power receivable range that can be received by the power receiver when the second adjustment is performed.

* * * * *